Aug. 13, 1963 G. A. HATHERELL ETAL 3,100,307
SCREW AND WASHER ASSEMBLING MACHINE
Filed Dec. 7, 1959 7 Sheets-Sheet 1
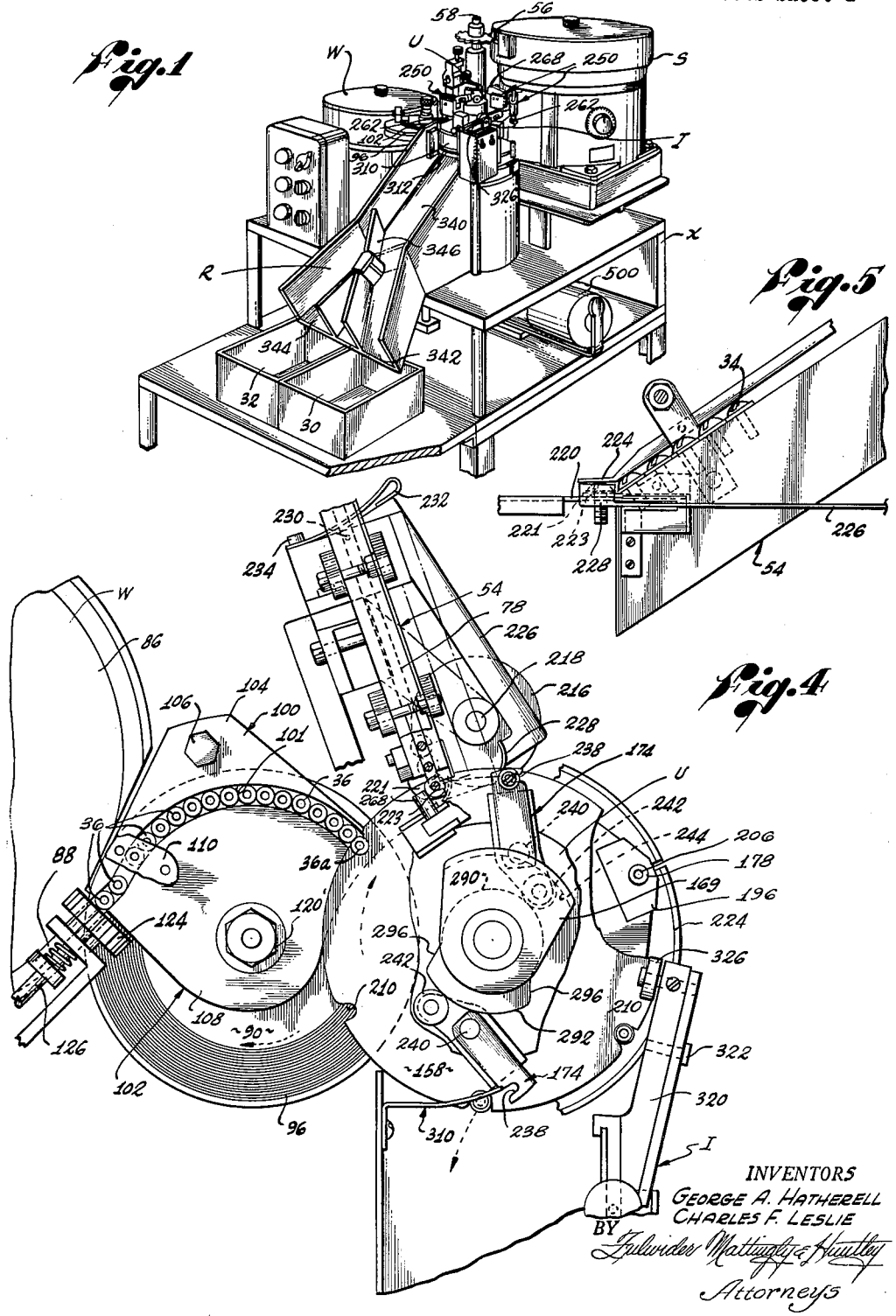
INVENTORS
GEORGE A. HATHERELL
CHARLES F. LESLIE
BY
Attorneys Aug. 13, 1963  G. A. HATHERELL ETAL  3,100,307
SCREW AND WASHER ASSEMBLING MACHINE
Filed Dec. 7, 1959  7 Sheets-Sheet 2
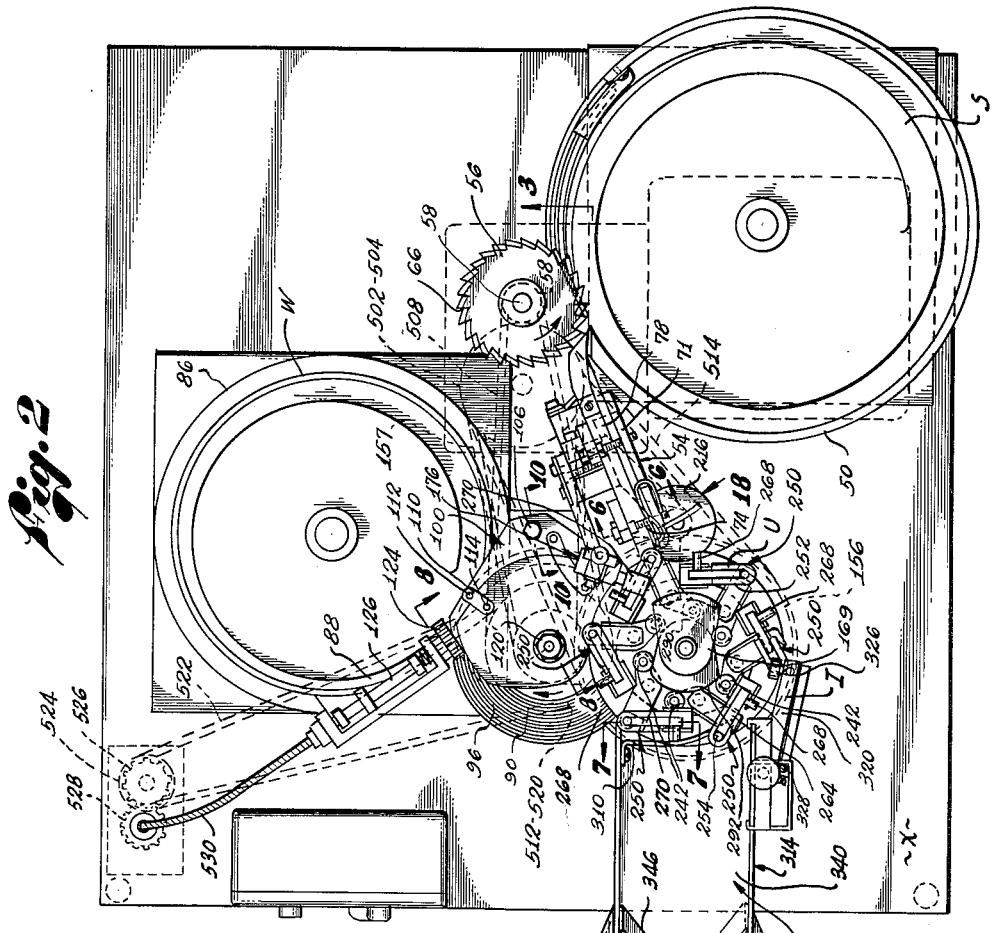
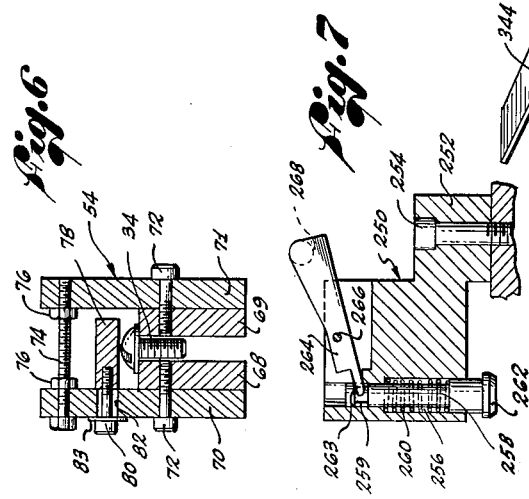
INVENTORS
GEORGE A. HATHERELL
CHARLES F. LESLIE
BY
Attorneys

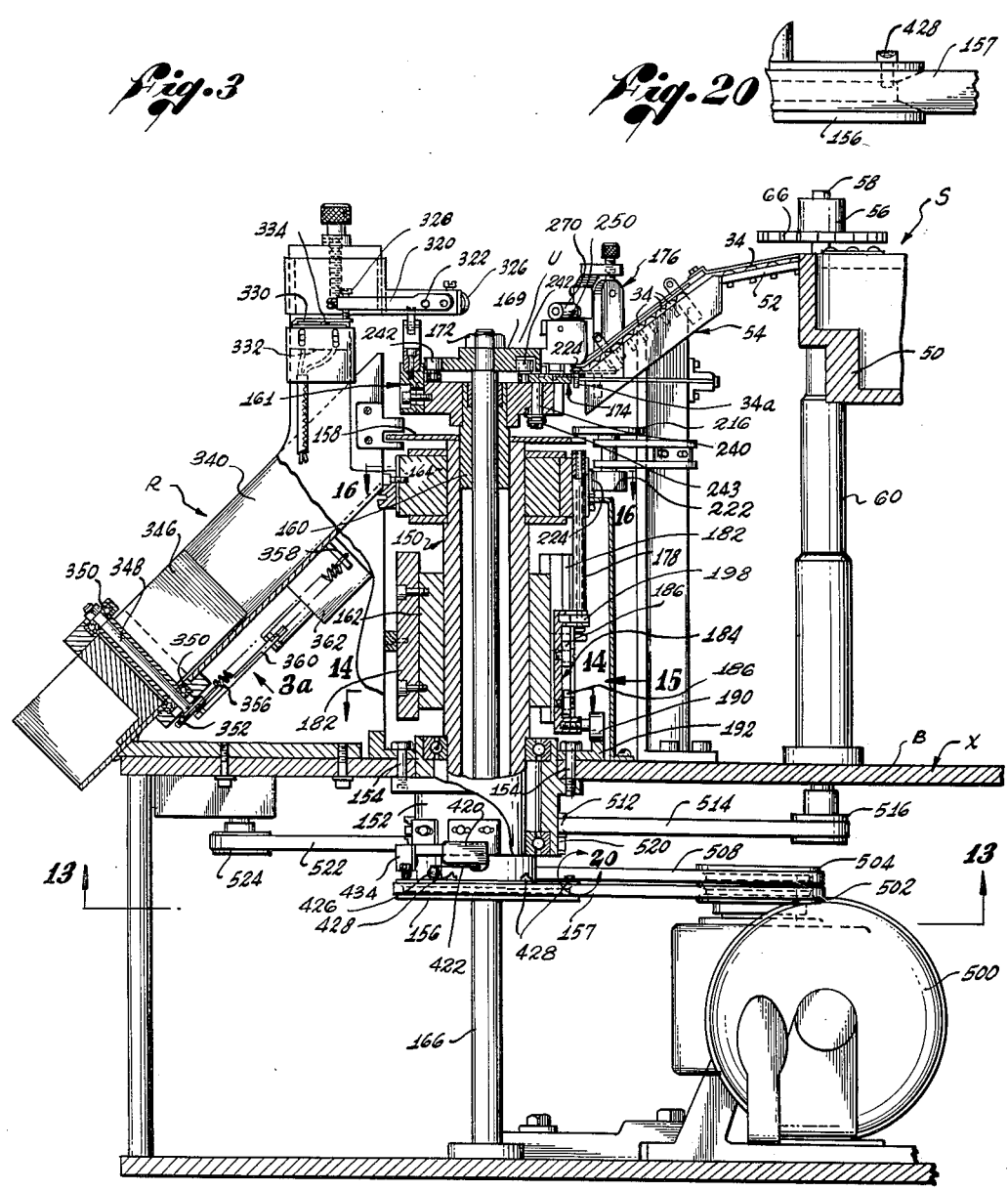
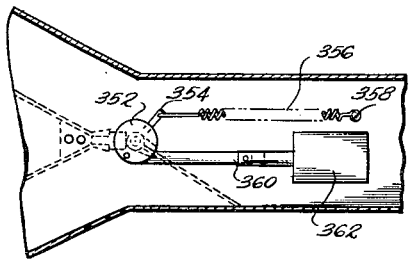

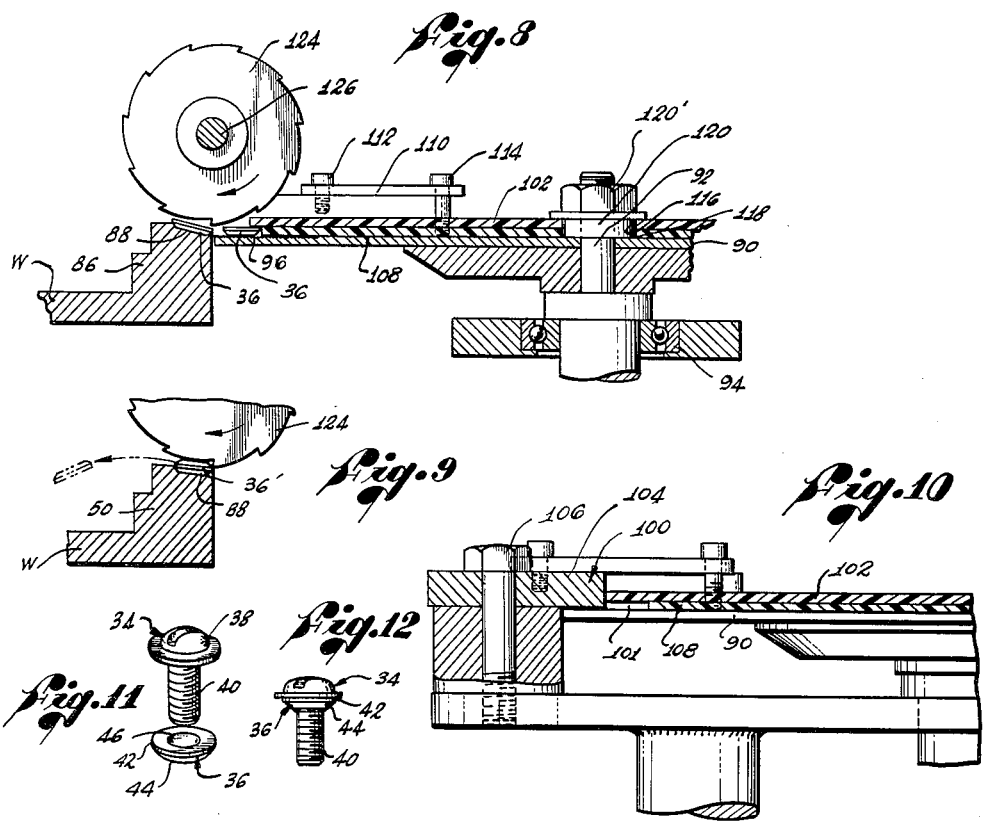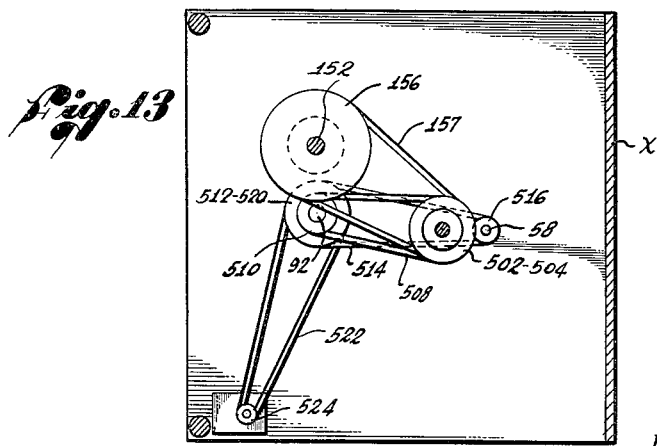

Aug. 13, 1963    G. A. HATHERELL ETAL    3,100,307
SCREW AND WASHER ASSEMBLING MACHINE
Filed Dec. 7, 1959    7 Sheets-Sheet 5
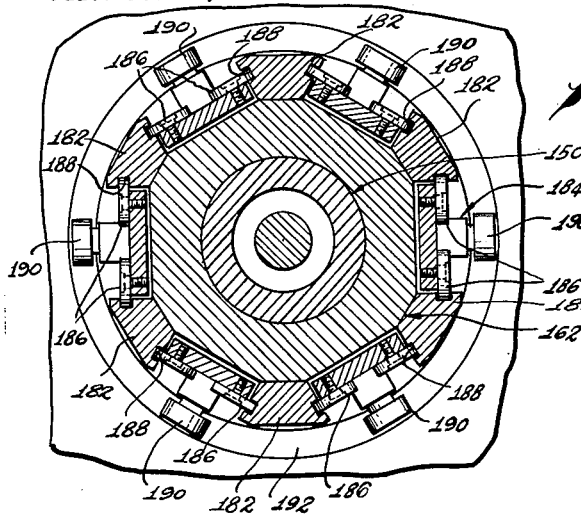
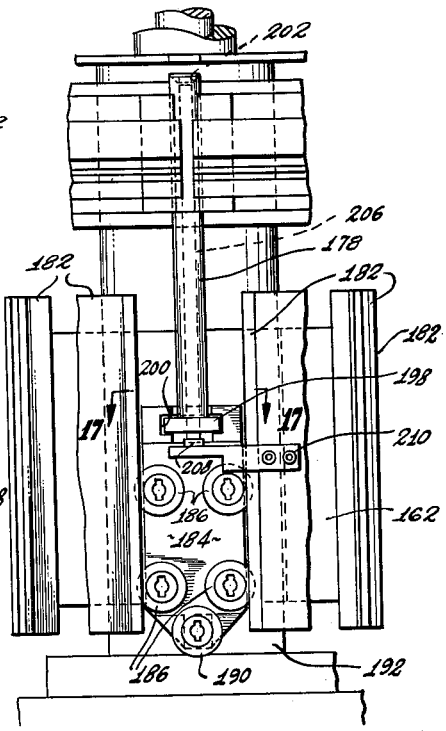
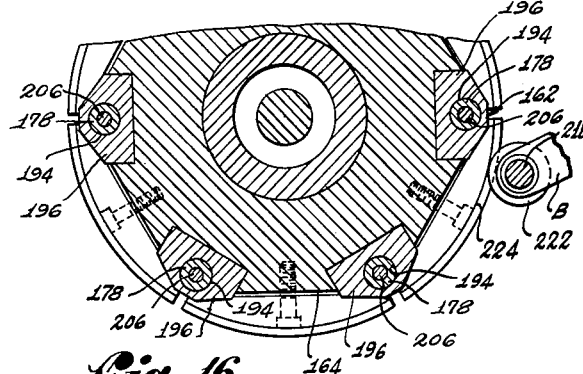
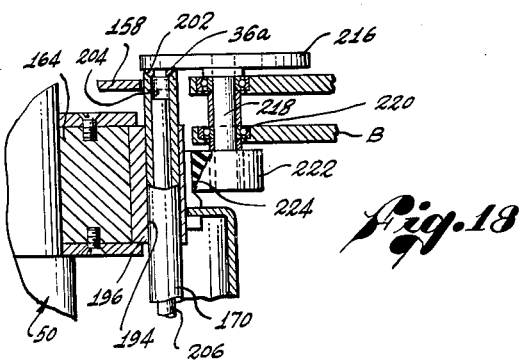
INVENTORS
GEORGE A. HATHERELL
CHARLES F. LESLIE
BY *Gulwider Mattingly & Huntley*
Attorneys Aug. 13, 1963    G. A. HATHERELL ETAL    3,100,307
SCREW AND WASHER ASSEMBLING MACHINE
Filed Dec. 7, 1959    7 Sheets-Sheet 7
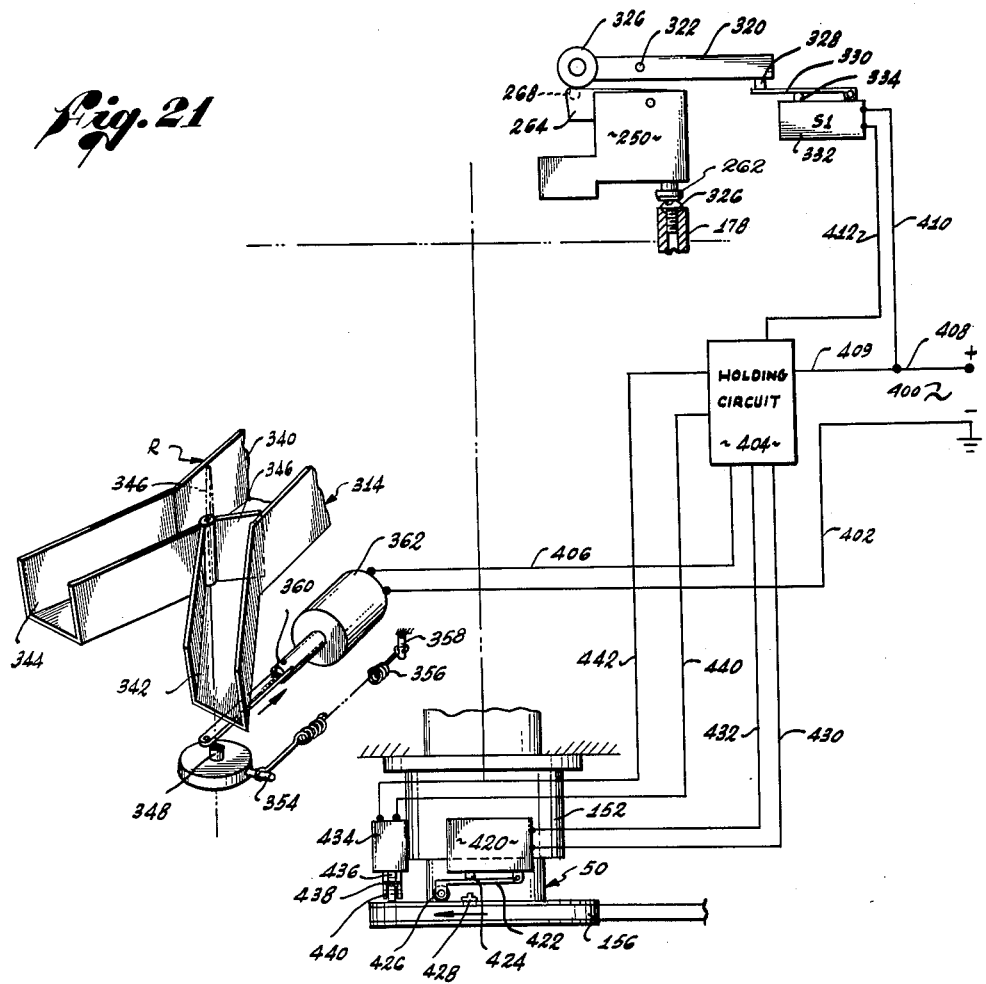
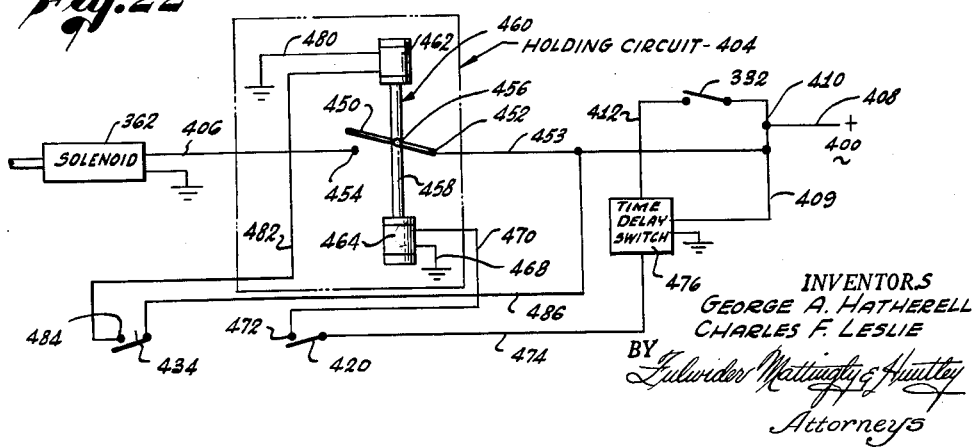
INVENTORS
GEORGE A. HATHERELL
CHARLES F. LESLIE
BY
Attorneys United States Patent Office 3,100,307
Patented Aug. 13, 1963

3,100,307
SCREW AND WASHER ASSEMBLING MACHINE
George A. Hatherell, Sunland, and Charles F. Leslie, Burbank, Calif., assignors to The National Screw & Manufacturing Co., Cleveland, Ohio, a corporation of Ohio
Filed Dec. 7, 1959, Ser. No. 857,763
34 Claims. (Cl. 10—155)

The present invention relates generally to machine tools and more particularly to a novel and improved screw and washer assembling machine.

There is presently a demand for large numbers of assemblies consisting of a machine screw and a washer disposed upon the shank of such screw. In many instances the washer is formed of a natural or synthetic rubber and its inside diameter is slightly smaller than the shank of the machine screw. Previously, the washer has been manually urged over the end of the screw shank opposite the screw head and moved axially along the shank to a position underlying the screw head. Such manual assembling practices are quite costly, with the labor charge for placing the washer upon the screw in many instances approximating the cost of the parts themselves. Additionally, considerable shop space must be assigned to the workmen effecting the application of the washers to the screws.

It is a major object of the present invention to provide a machine which automatically effects the application of a washer to a machine screw or the like. The utilization of such machine permits the assembling operation to be accomplished at far lower cost than where such assembling is performed manually.

In certain applications the top portion of the washer has a different configuration than the bottom portion and it is essential that the top surface of the washer abut the underside of the screw head. Where the application of the washer to the screw is accomplished manually it often occurs that inadvertently the workmen place the washer upon the screw in an inverted position. For this reason it is necessary to carefully inspect the assembled units in order that the defective parts may be eliminated.

It is another object of the present invention to provide a machine of the aforedescribed nature which automatically aligns the washer properly relative to the head of the screw.

Yet another object of the present invention is to provide an automatic machine of the aforedescribed nature which is capable of producing a large number of parts without requiring any attention from the operator other than the feeding of unfinished parts thereinto.

It is an additional object of the present invention to provide a machine of the aforedescribed nature having unique arrangements for detecting and rejecting faulty parts which have passed through the machine. This eliminates the necessity of carefully inspecting the completed parts for the subsequent rejection of faulty parts.

Yet a further object of the present invention is to provide a machine of the aforedescribed nature which is light in weight and compact in size and has its operating mechanisms readily accessible.

These and other objects and advantages of the present invention will become apparent from the following detailed description, when taken in conjunction with the appended drawings wherein:

FIGURE 1 is a perspective view of a preferred form of screw and washer assembling machine embodying the present invention;

FIGURE 2 is a top plan view in enlarged scale of said machine;

FIGURE 3 is a vertical sectional view taken along line 3—3 of FIGURE 2;

FIGURE 3a is a view of a rejecting gate assembly of said machine taken from the position indicated at 3a in FIGURE 3;

FIGURE 4 is a top plan view in further enlarged scale showing the means employed to automatically feed the screws and washers into said machine;

FIGURE 5 is a fragmentary side elevational view showing the lower portion of a feed chute for the screws entering said machine;

FIGURE 6 is a vertical sectional view in enlarged scale taken along line 6—6 of FIGURE 2;

FIGURE 7 is a vertical sectional view in enlarged scale taken along the line 7—7 in FIGURE 2;

FIGURE 8 is a vertical sectional view in enlarged scale taken along the line 8—8 in FIGURE 2 and particularly showing a washer feed wheel used in said machine;

FIGURE 9 is a fragmentary view of the left-hand portion of FIGURE 8 showing how said washer feed wheel automatically eliminates an unoriented washer;

FIGURE 10 is a vertical sectional view in enlarged scale taken along the line 10—10 of FIGURE 2;

FIGURE 11 is a perspective view of a machine screw and washer adapted to be placed in assembled relationship by said machine;

FIGURE 12 is a side elevational view of said screw and washer in properly assembled condition;

FIGURE 13 is a horizontal sectional view in reduced scale taken along line 13—13 of FIGURE 3;

FIGURE 14 is a horizontal sectional view in enlarged scale taken along line 14—14 of FIGURE 3;

FIGURE 15 is a fragmentary side elevational view in enlarged scale taken from the position indicated at 15 in FIGURE 3;

FIGURE 16 is a fragmentary horizontal sectional view in enlarged scale taken along line 16—16 of FIGURE 3;

FIGURE 17 is a fragmentary horizontal sectional view taken along line 17—17 of FIGURE 15;

FIGURE 18 is a fragmentary vertical sectional view in enlarged scale taken along the line 18—18 of FIGURE 2;

FIGURE 19 is a diagrammatic view showing the operation of the automatic inspection mechanism of said machine;

FIGURE 20 is a fragmentary view in enlarged scale of the encircled portion designated 20 in FIGURE 3;

FIGURE 21 is a diagrammatic showing of the rejecting gate assembly of said machine; and FIGURE 22 is a wiring diagram of suitable holding circuit which may be employed with said rejecting gate assembly.

*General Arrangement*

Referring to the drawings, the preferred form of machine screw and washer assembling machine embodying the present invention includes a fixed frame or base X whereon are mounted a vibratory parts feeder W containing washers, and a vibratory parts feeder S for containing the screws which are to be received by such washers. The screws and washers are fed into an assembling unit U disposed between the parts feeders W and S. The assembled screws and washers pass to an inspection unit I and are discharged into rejection unit R. This unit R automatically directs properly assembled parts into a first receptacle 30, while improperly assembled parts are directed into a second receptacle 32.

Referring now to FIGURES 11 and 12, there is shown a typical screw 34 and washer 36 adapted to be assembled by the machine of the present invention. Such screw 34 includes a head 38 and a shank 40. The washer 36 may be assumed as being formed of a rubber-like material and its inner diameter is somewhat smaller than the diameter of the shank 40. It will be observed that the washer 36 is formed with a generally cylindrical upper portion 42 and a radially downwardly and inwardly inclined lower portion 44. For the purposes of this description it may be considered essential that the upper portion of the washer abut the underside of the head 38 of the screw in the manner indicated in FIGURE 12. It is also preferable that prior to the assembling operation the hole 46 of the washer is not formed completely through the depth of the washer. Instead, the lower end of this hole 46 will initially be closed by a thin web of the washer material. With this arrangement, as the washer is inserted upon the shank 40 of the screw 34, the shank will punch through the rubber-like web originally closing the lower end of the hole 46. The flash from such punching operation will then retain the washer upon the screw in the position shown in FIGURE 12.

The Screw Feeding Means

The aforementioned vibratory parts feeder S for the screws 34 is of conventional construction. In practice the parts feeder marketed by the Syntron Co. of Homer City, Pennsylvania, has proven satisfactory. This product is represented as being manufactured under various United States Letters Patent, including Patent Nos. 2,464,216, 2,609,914 and 2,615,184. As shown in FIGURE 3 the parts feeder S includes a bowl 50 from one side of which extends a downwardly sloping track 52. The end of this track 52 opposite the bowl 50 empties into the upper end of a screw feed chute 54. As is conventional, the vibrations imparted to the parts feeder S cause the screws 34 to enter the track 52 and the screw feed chute 54 wherein such screws move towards the assembling unit A under the influence of gravity.

With continued reference to FIGURE 3 and referring also to FIGURE 2, a screw knock-off wheel 56 is disposed adjacent the upper end of the track 52. This knock-off wheel 56 is keyed to a vertical shaft 58 that is journaled within an upright column 60 secured to the base C. The lower end of the shaft 58 is keyed to a pulley 516 that is caused to rotate by means of a belt 514. The periphery of the knock-off wheel 56 is formed with notches 66. This knock-off wheel 56 rotates in a clockwise direction as viewed in FIGURE 2 and is disposed at an elevation slightly above the elevation of the heads of the screws 34 moving into the upper end of the track 52. With this arrangement the shank of any screw 34 trying to enter the upper end of the track 52 in an inverted position will be automatically knocked back into the parts feeder bowl 50, since the shank of such screw will be engaged by the notched periphery of the knock-off wheel 56.

Referring now to FIGURE 6 the screw feed chute 54 includes a pair of side walls 68 and 69 that are held in spaced relationship by means of a plurality of pairs of retaining posts 70 and 71, respectively, each side wall being connected to a post 70 or 71 by a machine screw 72. The upper ends of each pair of retaining posts 70 and 71 are interconnected by a single machine screw 74 whereon are carried a pair of adjustment nuts 76. With this arrangement the horizontal distance between the side walls 68 and 69 can be readily varied to accommodate various size screws. The chute 54 also includes a horizontally extending upper guide 78 disposed above the heads of the screws 34. This upper guide 78 is secured to the aforementioned posts 70 and 71 by means of machine screws 80 which are in turn slidably disposed within a vertical slot 82 and are provided with washers 83. This arrangement permits the vertical distance between the upper guides 78 and the side walls 68 to be readily adjusted to accommodate screws 34 of varying heights. The screws 34 are released into the assembling unit A from the lower end of the screw feeding chute 54 in a manner to be fully described hereinafter.

The Washer Trading Means

The aforedescribed vibratory parts feeder W for the washers 36 may be similar in construction to the vibratory parts feeder S. As shown in FIGURES 4 and 8, this vibratory parts feeder W includes a bowl 86 along one side of which is formed a track 88 through which the washers 36 move towards a horizontally extending washer transfer disc 90. This transfer disc 90 rotates in a clockwise direction relative to FIGURES 2 and 4 so as to transfer washers 36 from the vibratory parts feeder W to the assembling unit U. The transfer disc 90 is keyed to an upright shaft 92 that extends through a bearing assembly 94 as shown in FIGURE 8. Preferably, the upper surface of this disc 90 is formed with spiral grooving 96 which tends to move the washers 36 inward on the radius of disc 90 and thereby help transfer from bowl 86 to transfer disc 90. Additionally, keeping the washers sliding on the crests of the spiral keeps the disc 90 from becoming gummed-up.

A continuation of the track 88 from the bowl 86 to the assembling unit A across the transfer disc 90 is provided by a guide member 100. This guide member 100 is formed with an arcuate passageway 101 that defines a continuation of the track 88. The guide member 100 is preferably formed of a transparent synthetic plastic material such as Plexiglas. A cover 102 also of a material such as Plexiglas is provided for this guide member. As indicated in FIGURE 4, the outer portion 104 of the guide member 100 is secured to the base X by means of a stud or screw 106. The cover 102 is held in place by means of a support arm 110 and bolt 112 and hold-down screw 114, as indicated in FIGURES 4, 8 and 10. Additionally, the inner portion 108 of guide member 100 and the Plexiglas cover 102 are formed with bores 116 and 118, respectively, which are received by an enlarged collar that is slidably carried by the transfer disc shaft 92. This collar 120 is of lesser diameter than bores 116 and 118 whereby shaft 92 may rotate freely relative to the guide member and cover. The guide member 100 and Plexiglas cover 102 are restrained against upward movement and the transfer disc 90 is held in place upon the shaft 92 by means of a keeper nut 120. This keeper nut 120 is tightened sufficiently to cause shaft 92 to drive the transfer disc 90.

Referring now particularly to FIGURES 4, 8 and 9 there is shown a washer knockout wheel 124 which is disposed at right angles to and intersects the washer track 88. This washer knockout wheel 124 is keyed to a shaft 126 that is suitably journaled adjacent the sides of the vibratory parts feeder W, and is rotated in a manner to be described hereinafter. Referring to FIGURE 8, the outer portion of this washer knockout wheel 124 is notched and it will be seen that the wheel rotates in a clockwise direction relative to this figure. It is the purpose of this washer knockout wheel 124 to remove from the washer track 88 any washer 36 which enters the track 88 in an inverted position. This is essential in order to prevent the assembling of any washers 36 upon the screw 34 in an inverted position, i.e. with the lower portion 44 of the washer in abutment with the underside of the head 38 of the screw 34.

The operation of the washer knockout wheel 124 will be readily apparent from a comparison of FIGURES 8 and 9. Thus, referring first to FIGURE 8 it will be observed that the profile of the washer track 88 generally corresponds to the profile of the washer 36 when the latter is arranged in proper position to be applied upon the screw 34. Thus, when the washers 36 are moving along the track 88 in a proper position its sides will generally conform with the sides of the washer track 88. At this time the periphery of the washer knockout wheel 124 will clear the upper portion of the washer 36. Should, however, a washer 36′ enter the track 88 in an inverted position, as indicated in FIGURE 9, it will not conform to the sides of the track 88 and instead it will move therealong in a raised position relative to the track. The elevation of the washer 36′ at this time will be sufficiently high that the washer will be engaged by the rotating knockout wheel 124 so as to be forced out of the track 88 and back into the confines of the bowl 86 of the vibratory parts feeder W. To facilitate this operation the side of the track adjacent the bowl 86 will be reduced in height at its point of intersection with the knockout wheel 124.

The Assembling Unit U

Referring now particularly to FIGURE 3, the assembling unit U includes an upright tubular main spindle 150 which is journaled at its lower portion within a spindle support hub 152. The latter is rigidly affixed to the base B by means of bolts 154. The lower end of the main spindle 152 is keyed to a pulley 156 that is driven by a belt 157. A horizontally extending washer pick-up disc 158 is keyed to the upper portion of the spindle 150. A spindle sleeve 160 is telescopically rigidly affixed within the upper portion of the spindle 150. This sleeve is keyed to a screw pick-up head 161. The intermediate portion of the spindle 150 supports a plunger carriage support head 162, with the details of this plunger support head being shown in FIGURES 14 through 18. Above the plunger carriage support head 162 a plunger guide collar 164 is keyed to the spindle 150. Coaxially disposed within the main spindle 150 is a fixed column 166, the lower end of this column being rigidly affixed to the base X. The upper portion of the column 166 extends through the aforedescribed spindle sleeve 160. The upper end of the column 166 is of reduced diameter and a finger retract cam 169 is rigidly secured thereupon by means of a nut 172. This finger retract cam 169 cooperates with a plurality of screw pick-up fingers 174 carried by the screw pick-up head 161 and a screw lock-up release member 176 to deliver screws 34 to a plurality of transport plungers 178 carried by the support head 162 in a manner to be described hereinafter.

The Arrangement of the Transport Plungers 178

Referring now to FIGURES 3 and 14 through 19, the plunger carriage support head 162 is keyed to the intermediate portion of the spindle 150. This head 162, as indicated in FIGURES 14 and 15, is formed with a plurality of vertically extending tracks, each designated 182, wherein are disposed a plurality of plunger carriages, each designated 184. The carriages 184 are provided with upper and lower pairs of wheels 186 which rotate within slots 188 formed in the head 162 so as to permit vertical reciprocation of the carriages 184 relative to the head 162. The lower portion of each carriage 184 is provided with a roller 190 that rotates upon the upper surface of an annular cam track 192. As indicated in FIGURE 19, the upper surface of this cam track 192 is provided with various lifts and falls. The cam track 192, as indicated in FIGURE 3, is rigidly affixed to the base X by means of the bolts 154. Accordingly, upon rotation of the spindle 150 and consequently the head 162, the rollers 190 will move along the upper surface of the cam track 192 so as to impart vertical reciprocation to the plunger carriages 184.

The upper portion of each plunger carriage 184 is rotatably attached to one of the transport plungers 178. Each plunger is of tubular construction and as indicated in FIGURE 18 the upper portion of each plunger is rotatably carried within the bore 194 of a bearing element 196 that is affixed to the plunger guide collar 164. The lower end of each transport plunger 178 is provided with a head 198 which is rotatably disposed within a cavity 200 formed in the upper portion of each carriage 184 so as to restrain the plunger against vertical movement independently of the carriage. As indicated in FIGURE 18, the upper end of each transport plunger 178 is formed with a concave surface 202 that conforms generally to the profile of the washers 36. The bore 204 of each plunger is of slightly larger diameter than the shank 40 of the screws 34.

There is telescopically slidably arranged within each of the transport plungers 178 an ejection rod 206. The diameter of these ejection rods is slightly less than the diameter of the plunger bores 204. The lower end of each of these rods 206 is formd with an enlargement 208 that rests upon a horizontally extending retainer 210, with each retainer being rigidly affixed to the head 162 to one side of one of the tracks 182. During vertical reciprocation of the transport plungers 178 by means of the carriages 184 the ejection rods 206 will thus remain at the same elevation.

Transfer of the Washers 36 to the Transport Plungers 178

Referring now particularly to FIGURES 4, 18 and 19, the washer pick-up disc 158 is formed with a plurality of circumferentially-spaced washer-receiving notches 210. These notches 210 are in vertical alignment with the aforedescribed plungers 178. With particular reference to FIGURE 4, the washer pick-up disc 158 rotates in a clockwise direction relative to this figure. Accordingly, as one of the notches 210 moves into alignment with the end of the passageway 101 adjacent the washer pick-up disc, a washer 36a will be forced into the confines of the notch 210.

Referring now to the left-hand portion of FIGURE 19 one of the transport plungers 178a is shown at a position designated —A— disposed vertically below the washer 36a of FIGURE 4 at such time as the notch 210 is moving towards the end of the passageway 101. As the washer pick-up disc 158 rotates clockwise towards the edge of the transfer disc 90 the plunger 178a will move to its position of FIGURE 19 designated —B—, i.e. it will move adjacent the edge of the transfer disc 90. During such movement of the plunger 178a from position —A— to position —B—, the carriage 184a will be raised by virtue of having passed over a first rise 212 formed in the cam track 192. Accordingly, the upper end of the plunger 178a will move along the course indicated in phantom outline in FIGURE 19 so as to be disposed in vertical alignment with the edge of the transfer disc 90 at the same time that the washer 36a is moved off this edge of the transfer disc. Accordingly, the washer 36a will be received by the upper end of the transport plunger 178a.

Referring now to FIGURE 18, as well as with continued reference to FIGURE 19, transport plunger 178a will continue to carry the washer 36a to the position designated —C— in FIGURE 19. At this point the cam track 192 is formed with a slight projection 214. The engagement of the cam roller 190 with this projection 214 will cause the plunger 178a to be raised slightly from its position at —B—. In this raised position the plunger 178a will bring the washer 36a into contact with the underside of a squaring-up disc 216. This squaring-up disc 216 is keyed to the upper end of a shaft 218 that is rotatably supported within a bearing structure 220 that is in turn affixed to the frame X. The lower end of the shaft 218 is keyed to a rubber wheel 222. The periphery of this rubber wheel 222 is in engagement with a vertically extending surface 224 of the plunger guide 164. Accordingly, upon rotation of the spindle 50 and guide 164 the squaring-up disc 216 will be caused to undergo concurrent rotation. As the plunger 178a continues its movement to the right of position —C— in FIGURE 19, the washer will abut the underside of the squaring-up disc 216 whereby it will be caused to assume a horizontal position relative to the upper end of its plunger 178a.

Transfer of the Screws 34 to the Transport Plungers 178

Referring now to FIGURES 4 and 5 as described hereinbefore the screws 34 move downwardly along the screw feed chute 54 towards the assembling unit U. As indicated in these figures, the lower end of the chute 54 is provided with a horizontally extending screw release plate 221. This screw release plate 221 is formed with a screw-release notch 223 that faces towards the direction of rotation of the washer pick-up disc 158 relative to FIGURE 4. A spring finger 224 is formed at the lower end of the chute guide 78 and serves to prevent upward movement of the heads of the screws 34 when they are disposd within the notch 223 of the screw release plate 221.

The screws entering the notch 223 are initially retained against movement therefrom in a direction facing towards the direction of rotation of the washer pick-up disc 158 by means of a horizontally movable retaining arm 226, the free end of this arm 226 being provided with an arcuate lip 228 that covers the opening of the notch 223 when the retaining arm 226 is disposed in its phantom outline position of FIGURE 4. The opposite end of the retaining arm 226 is pivotally secured to the base X by means of a vertical pivot pin 230. The retaining arm 226 is constantly biased towards this phantom outline position by means of a spring finger 232 having one of its ends affixed to the base X by means of a machine screw 234.

With this arrangement, the lip 228 of the retaining arm 226 will serve to hold the lowermost screw 34 within the notch 223 in the proper position to be picked up by one of the aforementioned screw pick-up fingers 174 carried by the screw pick-up head 161.

With reference to FIGURES 3 and 4, each of the screw pick-up fingers 174 is formed with a screw-receiving notch 238 at its outer end relative to the head 161. The intermediate portion of each screw pick-up finger is pivotally secured to the head 161 by means of a vertically extending pivot pin 240, each finger being keyed to the upper end of its pin. The inner end of each screw pick-up finger 174 is provided with a cam roller 242 which moves along a cam track 244 defined by the finger retract cam 169. A torsion spring 243 (see FIGURE 3) is interposed between the lower end of each pin 240 and the head 161 so as to constantly bias the cam roller 242 of its respective finger 174 against the radially inner surface of the cam track 244.

Referring now particularly to FIGURES 2, 7 and 19 a screw head lock-up 250 is provided on the screw pick-up head 161 for each of the screw pick-up fingers 174 in vertical alignment therewith. Each such screw head lock-up 250 includes a body 252 that is rigidly affixed to the head 161 by means of a machine screw 254 at one end of the body. The opposite end of the body 252 is provided with a vertical plunger bore 256 wherein is disposed a vertically movable lock-up plunger 258. A coil compression spring 260 disposed within an enlarged portion of the bore 256 constantly biases the lock-up plunger 258 downwardly. The lower end of the lock-up plunger 258 is formed with a head 262 that is adapted to abut the head 38 of each of the screws 34 while they are disposed within the notch 238 of the screw pick-up fingers 174. The upper portion of the lock-up plunger 258 is formed with a groove 259 that receives the bifurcated end 263 of a hold-down lever 264. The intermediate portion of this hold-down lever 264 is pivotally attached to the body 252 by means of a horizontal pivot pin 266. The opposite end of the hold-down lever 264 is formed with a rigid horizontally extending bar 268.

With particular reference now to FIGURES 2, 7 and 19, as a screw pick-up finger approaches the notch 222 of the screw release plate 220 and the screw 34a disposed therewithin, it is essential that the lock-up plunger 258 be raised so as to clear the guide 220 and the head of the screw 34a. As indicated in FIGURE 19 at the upper left hand portion thereof, this is accomplished by the engagement of the hold-down lever bar 268 with a vertically extending roller 270 carried by the screw lock-up release member 176. Thus, as the bar 268 engages this roller 270, the bar 268 will be depressed so as to concurrently raise the opposite end of the hold-down lever 264. This upward movement of this end of the lever 264 is transferred to the lock-up plunger 258 by the bifurcations 263. Accordingly, as indicated in the upper left-hand portion of FIGURE 19, the lock-up plunger 258 will be raised so as to clear the screw release plate 211 and the head of the screw 34a. As the spindle 50 continues its clockwise movement the bar 268 will clear the roller 270 and the spring 260 will again depress the lock-up plunger 258 whereby the head 262 thereof will abut the head of the screw 34a and thereby retain the screw upon the finger 174 within the notch 238 thereof as the spindle continues its rotation.

With continued reference to FIGURE 19, as the spindle 50 continues its rotation the plunger carriage 184a will move upwardly along a major rise 276 of the cam track 192. Accordingly, the transport plunger 178a will likewise be lifted. As the plunger 178a approaches the position designated —E— in FIGURE 19, its upper portion will gradually encompass the shank of the screw 34a, such screw moving through the confines of the washer 36a disposed in the upper end of this plunger.

*Removal of the Assembled Screws and Washers From the Transport Plungers 178*

As the transport plunger 178a approaches the position —F— in FIGURE 19, it is necessary to retract the screw pick-up finger 174a. This is accomplished by means of the aforedescribed cam roller 242. Thus, referring to FIGURES 2 and 4, it will be observed that cam track 244 has an arcuate surface 290 that generally faces the vibratory parts feeders S and W. A second arcuate surface 292 that is disposed at a greater radius than the surface 290 relative to the axis of rotation of the spindle 50 is formed on the cam track 244 generally diametrically opposite surface 290. These surfaces 290 and 292 are connected by a pair of short transition surfaces 296. With this arrangement the screw pick-up fingers 174 will be disposed in an outermost screw and washer-receiving position (as indicated by the uppermost finger shown in FIGURE 4) when the cam roller 242 is following the surface 290. As the cam roller 242 moves off this surface 290 and onto the surface 292, however, along the transition surface 296, the screw pick-up fingers 174 will be retracted relative to the spindle 50 (as indicated by the lowermost finger shown in FIGURE 4). This retraction is effected by the occurrence of counter-clockwise pivoting of the fingers 174 relative to their pivot pins 240 in FIGURE 4 and it starts to take place prior to the time the fingers 174 reach the area of the inspection unit I. The pick-up fingers will remain in this retracted position until they have passed through the positions designated —F—, —G— and —H— in FIGURE 19.

When the screw pick-up finger 174a has started to retract the plunger carriage 184a will start moving downwardly along a downwardly sloping surface 298 of the cam track 192. Accordingly, the transport plunger 174a and the now-assembled screw and washer 34a, 36a supported thereby will likewise undergo a downward movement until the cam roller 190 will reach a level surface 306 of the cam track 192. At the same time the upper end of the transport plunger 178a will be moving downwardly relative to the upper end of the ejection rod 206a. Accordingly, the ejection rod 206a will tend to force the screw 34a out of the upper end of the plunger. As the screw 34a is being forced upwardly out of the transport plunger the latter will have approached a stripper unit 310 that is fixed to the frame X at the upper end of the rejecting gate assembly R. As indicated in FIGURES 3, 4 and 19, the stripper unit 310 is defined by a metal plate formed with a horizontally extending slot 312 that provides clearance for the washer pick-up disc 158. As the screw and washer assembly 34a, 36a is being ejected upwardly from the transport plunger 178a it will engage the stripper unit 310 so as to be knocked therefrom into the upper portion of a downwardly extending chute 314 of the rejection unit R, as indicated by the directional arrow at the lower portion of FIGURE 4.

The Inspection Unit I

During the aforedescribed operation of the assembling unit A it is possible that a transport plunger 178a will fail to receive a washer 36. In such event it is very desirable to automatically reject the washer-less screw 36 carried by the transport plunger to the chute 314. This eliminates the necessity of carefully inspecting the parts discharged into this chute. In order to sense whether or not each screw receives a washer there is provided the inspection unit I.

Referring to FIGURES 2, 3, 19 and 21 this inspection unit I includes a rocker arm 320 which is pivoted at its intermediate portion of the frame X by means of a horizontal pivot pin 322 at a point located at one side of the chute 314. One end of this rocker arm 320 carries a roller 326, while the opposite end thereof carries a set screw 328. The set screw 328 is engageable with the free end of an actuating finger 330 that has its opposite end pivotally secured to a conventional electrical microswitch 332 attached to the frame X. The intermediate portion of the finger 330 abuts the plunger 334 of the microswitch 332. The set screw 328 should be so adjusted that the free end of the finger 330 is normally in a raised position at which time the microswitch is in an "off" condition.

Referring now particularly to FIGURES 19 and 21, where the screw 34a is properly provided with a washer 36a the bar 268 of the screw hold-down lever 264 will be disposed at a sufficiently low elevation as to clear the lower end of the roller 270 of the inspection unit rocker arm 320. This is the condition indicated in FIGURE 19. Accordingly, the microswitch 332 would in this case remain in an "off" condition. Referring now to FIGURE 21 should, however, the screw 34b not be provided with a washer the lock-up plunger 258 will be disposed at a lower elevation than would be the case where the washer is in place. Consequently, the end of the hold-down lever 264 opposite this plunger 258 will be disposed in an elevated position relative to its normal condition. In such elevated condition the bar 268 will engage the lower end of the roller 270 so as to cause the opposite end of the inspection rocker arm 320 to be lowered. This movement will in turn be transferred by set screw 328 to the finger 330 whereby the plunger 334 will be depressed and the microswitch 332 will assume an "on" condition. Upon this occurrence the rejection unit R will in a manner set forth hereinafter reject the washerless screw 36b.

The Rejection Unit R

As noted hereinbefore, this unit includes a downwardly sloping chute 314 which is of inverted Y-shape and includes an upper leg 340 which merges into a pair of legs 342 and 344. The lower leg 342 transfers properly assembled parts to the receptacle 30, while the opposite leg 344 transfers washer-less screws to the receptacle 32. A gate 346 is provided at the junction of the legs 342 and 344 so as to cause parts moving down the central leg 340 to be deflected alternately into one lower leg or the other.

This gate 346 is keyed to the upper end of a gate shaft 348, as indicated particularly in FIGURES 3, 3a, and 21 This gate shaft 348 is pivotally supported within suitable bearings 350. The lower end of the gate shaft 348 is keyed to a disc 352, one side of which is formed with a peg 354 that receives the lower end of a tension spring 356 disposed below the chute 314 and parallel thereto. The upper end of this tension spring 356 is affixed to a retainer 358 that depends from the chute 314. At a point on the disc 352 opposite the peg 354 is pivotally affixed the lower end of the plunger 360 of a conventional electrical gate solenoid 362. The gate solenoid 362 is secured to the underside of the chute 314 and is normally not energized whereby the tension spring 356 will retain the gate in its solid outline position of FIGURE 1. Upon energization of the gate solenoid 362 the plunger will be retracted against the tension of the spring 356 so as to flip the gate 346 into its dotted outline position of FIGURE 1, corresponding to its solid outline position of FIGURE 21. At this time the gate will block the upper end of the chute leg 342, while permitting access to the opposite leg 344.

Referring now particularly to FIGURE 21, the gate solenoid 362 is connected to the microswitch 332 of the inspection unit I by suitable wiring. It should be particularly understood that a definite time interval will take place between the moment that the inspection unit I has detected the presence of a washerless screw in one of the transport plungers 178a and the moment that this washerless screw has been removed from its plunger and started dropping through the upper end of the chute 314. In this regard, and with reference to FIGURE 19 the inspection unit I will detect the presence of a washerless screw while the transport plunger 178 carrying such washerless screw is disposed at the position —F—. The washerless screw, however, will not be ejected from its transport plunger until the latter has reached a position generally corresponding to —H— in this figure. During this time interval the spindle 50 will have rotated through several degrees. Accordingly, it is not possible to directly interconnect the microswitch 332 and the gate solenoid 362. If such direct interconnection were provided the gate 346 would assume its parts rejecting position of FIGURE 21 as soon as the inspection unit I detected the presence of a washerless screw in the transport plunger 178 located at position —F— of FIGURE 19. Accordingly, the properly assembled parts immediately preceding the washerless screw into the chute 314 would be directed through the chute leg 344. Moreover, by the time the washerless screw reaches the chute 314, the gate solenoid 362 would no longer be energized and the gate 346 would have returned to its original position. The washerless screw would therefore be improperly directed into the chute leg 342.

In FIGURE 21, there is shown a suitable electrical circuit for properly actuating the gate 346 taking into account the time delay which necessarily must occur between the moment the inspection unit I detects the presence of a washerless screw in one of the transport plungers 178 and the time that this particular washerless screw enters the chute 314. Referring to this figure, there is shown a source of electrical current 400. One side of this source of electrical current is connected with the windings of the gate solenoid 362 by a lead 402. The opposite side of the solenoid windings are connected with a holding circuit 404 by a lead 406. The opposite side of the source of electric current is connected with the holding circuit 404 by means of leads 408 and 409, with a branch conduit 410 interconnecting the lead 408 and one side of the microswitch 332. The opposite side of the microswitch 332 is connected with the holding circuit 404 by a lead 412.

The exact construction of the holding circuit 404 is not important with regard to the scope of the present invention. Several holding circuit arrangements of this nature exist and it should be understood that the primary function of such arrangements is to provide a time delay in an electrical circuit. A suitable holding circuit is shown in FIGURE 22 and is fully described hereinafter.

In the present instance it is the function of the holding circuit 404 to provide a time delay between the time that the microswitch 332 has been moved from an "off" position to an "on" position and the time that the gate solenoid 362 is energized from the source of current 400. The holding circuit 404 also serves to provide de-energization of the gate solenoid 362 after a definite time interval. In this regard, it should be understood that the gate 346 must remain in its parts rejecting position of FIGURE 21 for the time necessary for washerless screw to move downwardly through the upper chute portion 340. If this gate 346 merely was swung from its dotted outline position of FIGURE 31 to its solid outline position therein and was immediately allowed to return there would be considerable likelihood that the washerless screw would not have reached the lower portion of the chute leg 340 in time to be deflected into the chute leg 344. It is for this reason that some means must be provided for retaining the gate 346 in its solid outline position of FIGURE 21 through a definite time interval. This is accomplished by means of a second microswitch 420 that is operatively connected with the holding circuit 404.

The microswitch 420 is rigidly affixed to the outside of the spindle support hub 152. This microswitch 420 includes a pivoted actuating finger 422, the intermediate portion of which is engageable with the plunger 424 of the microswitch. The free end of this actuating finger 422 carries a roller 426. The roller 426 is in alignment with a plurality of upstanding actuating pins 428 equal to the number of transport plungers 178 and formed on the pulley 156 of the spindle 50. The parts of the microswitch 420 are so arranged that as the roller 426 rolls along the upper surface of the spindle pulley 156 the microswitch 420 will be disposed in an "off" condition. When, however, one of the actuating pins 428 engages the roller 426 the latter will be raised whereby the actuating finger 422 will depress the plunger 424. When this occurs the microswitch will be depressed in an "on" condition. One side of the microswitch 420 is connected to the holding circuit 404 by a lead 430 while the opposite side of this microswitch is connected to the holding circuit by a lead 432.

A third microswitch 434 is supported by the spindle support hub 152 to one side of the microswitch 420. This third microswitch 434 is similar in construction to the aforedescribed microswitch 420 and includes a plunger 436 that is engaged by the intermediate portion of a pivoted actuating finger 438, with the free end of the latter carrying a roller 440. This roller 440 rolls along the upper surface of the hub pulley 156 and is disposed in the path of the aforementioned actuating pins 428. One side of the microswitch 432 is connected to the holding circuit 404 by a lead 440. The opposite side of this microswitch is connected with the holding circuit by a lead 442.

*Operation of the Rejection Unit R*

Referring now to FIGURES 21 and 22, the operation of the aforedescribed apparatus in rejecting a washerless screw will be described. As shown in FIGURE 22, the holding circuit 404 includes a main switch 450 having one end secured to the frame of the holding circuit device by means of a pivot pin 452. The free end of this main switch 450 is engageable with a fixed contact 454 that is connected by lead 453 with leads 408 and 409. When this connection is completed the windings of the gate solenoid 362 will be energized from the source of current 400. The intermediate portion of the main switch 450 is pivotally affixed by means of a second pivot pin 456 to the midportion of the plunger 458 of a double solenoid 460. The solenoid 460 includes an upper armature winding 462 and a lower armature winding 464, with the plunger 460 being reciprocally arranged relative to these windings. When the upper winding 462 is energized, the plunger 460 will be moved upwardly within the confines of the winding so as to move and retain the main switch 450 in its open position of FIGURE 22. When the lower winding 464 is energized the plunger 458 will be moved downwardly so as to close the main switch 450.

The upper solenoid winding 462 is caused to be energized whenever the second microswitch 420 is placed in an "on" condition. To this end, one side of this winding is connected to ground by a lead 468, while the other side of the winding 464 is connected by a lead 470 to the fixed contact 472 of the second microswitch 420. The opposite side of the microswitch 420 is connected by a lead 474 to a conventional time delay switch 476. This time delay switch is connected to lead 412 so as to receive electric current from the current source 400 whenever the microswitch 332 of the inspection unit I is closed. This time delay switch is of conventional construction and is arranged to continue the flow of current from current source 400 to lead 474 through a lead 409 for a predetermined interval of time after the microswitch 332 has returned to an "off" condition. After such interval of time the time delay switch 476 automatically opens.

The upper winding 462 of the double solenoid 460 has one of its sides connected to ground by a lead 480. The other side of this winding is connected by a lead 482 to the terminal 484 of the third microswitch 434. The opposite side of this microswitch 434 is connected to the lead 453 and hence the electric current source 400 by a lead 486.

With the aforedescribed arrangement, at such time as the inspection unit I detects the presence of a washerless screw in its transport plunger 178 and the first microswitch 332 is placed in an "on" position, electric current will flow through the leads 408, 410 and 412 into the time delay switch 476 of the holding circuit. This current will continue to flow through lead 474 for a predetermined time interval after the inspection unit microswitch 332 has returned to an "off" condition by means of lead 409. This current will flow to the lower solenoid windings 464 as soon as the second microswitch 420 is in an "on" condition. The closing of the second microswitch 420 will not take place until one of the projections 428 on the spindle pulley 156 engages the roller 426 of this microswitch. The microswitch 420 and the projections 428 are so located relative to the configuration of the apparatus that the microswitch will not be closed until the transport plunger 178 bearing the washerless screw has transferred the screw to a position wherein it has been ejected into the upper end of the chute 314 and has started falling down this chute. When the second microswitch 420 is closed, current will flow from the current source 400 through leads 409 and 474 into the lower solenoid windings 464 whereby the solenoid plunger 458 will be drawn downwardly and the main switch 450 will be closed. Upon closing of this main switch 450 electric current flows from current source 400 through the windings of the gate solenoid 362 by means of leads 408, 409 and 453. This solenoid will then cause the gate 346 to be moved from its dotted outline position of FIGURE 21 to its solid outline position shown therein. Accordingly, when the washerless screw reaches the intermediate portion of the chute 314 it will be deflected through the chute leg 344. The gate 346 will remain in this position for a sufficient time to insure that the washerless screw has passed from the chute portion 340 to the leg 344. This time interval is provided by the positioning of the third microswitch 434 relative to the projections 428 on the spindle pulley 156.

When the third microswitch 434 is closed, electric current from the current source 400 will flow through this switch and lead 482 by means of leads 408, 409, 453 and 486 so as to energize the upper solenoid 462. The plunger 458 of the solenoid 460 will then be drawn upwardly into its position of FIGURE 22 so as to open the main switch 450. The windings of the gate solenoid 362 will then be de-energized and the spring 356 will return the gate 346 to its normal position shown in dotted outline in FIGURE 21.

*The Means for Rotating the Various Elements of the Machine*

Referring now particularly to FIGURES 3 and 13, a conventional electric motor 500 is suitably connected to a pair of vertically spaced pulleys 502 and 504. The lowermost of these pulleys 502 drives the aforementioned belt 157 which encircles the spindle pulley 156 in driving relationship. The upper pulley 504 is connected by a belt 508 to a pulley 510. This latter pulley 510 is keyed to the lower portion of the vertical shaft 92. The upper end of this shaft 92 is keyed to the washer transfer disc 90. A second pulley 512 keyed to the shaft 92 above the pulley 510 carries a belt 514. The opposite end of this belt 514 encircles a pulley 516 that is keyed to the lower end of the shaft 58. The upper end of this shaft 58 is keyed to the screw kick-out wheel 56. The shaft 92 is keyed to yet a third pulley 520 spaced below the pulley 512 that receives a belt 522. The opposite end of this belt 522 encircles a pulley 524 that is keyed to a sprocket 526, as indicated in FIGURE 2. With continued reference to FIGURE 2 the teeth of the sprocket 526 are meshed with the teeth of a second sprocket 528 disposed immediately adjacent thereto. The second sprocket 528 is keyed to a flexible shaft disposed within a suitable protective sheath 530. This flexible shaft is keyed to the shaft 126 that drives the washer kick-out wheel 124.

While the embodiment of the invention illustrated and described herein is fully capable of achieving the objects and providing the advantages hereinbefore stated, it will be apparent that various modifications and changes may be made without departing from the spirit of the invention and the scope of the following claims.

We claim:

1. In an assembling machine for automatically disposing a washer or the like upon the shank of a screw or the like, the combination of: a frame; a horizontally extending washer transfer disc rotatably mounted upon said frame; a horizontally extending washer pick-up disc rotatably mounted on said frame, with a portion of said washer pick-up disc overlying said transfer disc and the periphery of said pick-up disc being formed with a plurality of washer-receiving elements; means on said frame defining a passageway overlying the upper surface of said transfer disc whereby said washers are directed into said washer-receiving elements; a spindle rotatably mounted on said frame on the axis of rotation of said pick-up disc; power-operated means on said frame for rotating said discs and spindle; a plurality of vertically movable transport plungers on said spindle, with each of said plungers being in vertical alignment with one of said washer-receiving elements so as to receive a washer therefrom adjacent the periphery of said pick-up disc; means interposed between said transport plungers and said frame to control the elevation of said plungers said means moving said plungers upwardly after they have received a washer; means on said spindle for aligning said screws with the upper end of said transport plungers after said plungers have received a washer whereby a washer received by a plunger will thereafter be urged upwardly upon the shank of a screw by the upward movement of said plunger; and parts stripping means on said frame disposed in the path of said transport plungers between said last-mentioned means and said transfer disc to strip the asesmbled washers and screws from said transport plungers.

2. In an assembling machine for automatically disposing a washer or the like upon the shank of a screw or the like, the combination of: a frame; a horizontally extending washer transfer disc rotatably mounted upon said frame; a vertically extending spindle rotatably mounted on said frame; a horizontally extending washer pick-up disc keyed to said spindle with a portion of said washer pick-up disc overlying said transfer disc and the periphery of said pick-up disc being formed with a plurality of washer-receiving elements; means on said frame defining a passageway overlying the upper surface of said transfer disc whereby said washers are directed into said washer-receiving elements; power-operated means on said frame for rotating said transfer disc and spindle; a plurality of vertically movable transport plungers on said spindle, with each of said plungers being in vertical alignment with one of said washer-receiving elements so as to receive a washer therefrom adjacent the periphery of said pick-up disc; means on said spindle for aligning said screws with the upper end of said transport plungers whereby a washer received by a plunger will thereafter be urged upwardly upon the shank of a screw by the upward movement of said plunger; parts stripping means on said frame disposed in the path of said transport plungers between said last-mentioned means and said transfer disc to strip the washers and screws from said transport plungers; means interposed between said transport plungers and said frame to control the elevation of said plungers, said means permitting said transport plungers to move downwardly as they approach said parts stripping means; and an ejection rod slidably disposed within each of said transport plungers, each of said rods being secured to said spindle and held against vertical movement whereby its upper end will eject an assembled washer and screw from its respective transport plunger adjacent said parts stripping means as its respective transport plunger moves downwardly.

3. In an assembling machine for automatically disposing a washer or the like upon the shank of a screw or the like, the combination of: a frame; a horizontally extending washer transfer disc rotatably mounted upon said frame; a vertically extending spindle rotatably mounted on said frame; a horizontally extending washer pick-up disc keyed to said spindle with a portion of said washer pick-up disc overlying said transfer disc and the periphery of said pick-up disc being formed with a plurality of washer-receiving notches; means on said frame defining a passageway overlying the upper surface of said transfer disc whereby said washers are directed into said washer-receiving notches; power-operated means on said frame for rotating said transfer disc and spindle; a plurality of vertically movable transport plungers on said spindle, with each of said plungers being in vertical alignment with one of said washer-receiving notches so as to receive a washer therefrom adjacent the periphery of said pick-up disc; cam means interposed between said transport plungers and said frame to control the elevation of said plungers said cam means urging said plungers upwardly after they have received a washer; means on said spindle for aligning said screws with the upper end of said transport plungers after said plungers have received a washer whereby a washer received by a plunger will thereafter be urged upwardly upon the shank of a screw by the upward movement of said plunger; and parts stripping means on said frame disposed in the path of said transport plungers between said last-mentioned means and said transfer disc to strip the assembled washers and screws from said transport plungers.

4. In an assembling machine for automatically disposing a washer or the like upon the shank of a screw or the like, the combination of: a frame; a horizontally extending washer transfer disc rotatably mounted upon said frame; a spindle rotatably mounted on said frame; a horizontally extending washer pick-up disc being formed with a plurality of washer-receiving notches; means on said frame defining a passageway overlying the upper surface of said transfer disc whereby said washers are directed into said washer-receiving notches; power-operated means on said frame for rotating said transfer disc and spindle; a plurality of vertically movable transport plungers on said spindle, with each of said plungers being in vertical alignment with one of said washer-receiving notches so as to receive a washer therefrom adjacent the periphery of said pick-up disc; means on said spindle for aligning said screws with the upper end of said transport plungers after said plungers have received a washer whereby a washer received by a plunger will thereafter be urged upwardly upon the shank of a screw by the upward movement of said plunger; parts stripping means on said frame disposed in the path of said transport plungers between said last-mentioned means and said transfer disc to strip the assembled washers and screws from said transport plungers; cam means interposed between said transport plungers and said frame to control the elevation of said plungers, said cam means permitting said transport plungers to move downwardly adjacent said parts stripping means; and an ejection rod slidably disposed within each of said transport plungers, each of said rods being secured to said spindle and held against vertical movement whereby its upper end will eject an assembled washer and screw from its respective transport plunger adjacent said parts stripping means as its respective transport plunger moves downwardly.

5. In an assembling machine for automatically disposing a washer or the like upon the shank of a screw or the like, the combination of: a frame; a horizontally extending washer transfer disc rotatably mounted upon said frame; a vertical spindle rotatably mounted on said frame; a horizontally extending washer pick-up disc keyed to said spindle with a portion of said washer pick-up disc overlying said transfer disc and the periphery of said pick-up disc being formed with a plurality of washer-receiving elements; means on said frame defining a passageway overlying the upper surface of said transfer disc whereby said washers are directed into said washer-receiving elements; power-operated means on said frame for rotating said transfer disc and spindle; a plurality of vertically movable transport plungers on said spindle, with each of said plungers being in vertical alignment with one of said washer-receiving elements so as to receive a washer therefrom adjacent the periphery of said pick-up disc; means interposed between said transport plungers and said frame to control the elevation of said plungers said means moving said plungers upwardly after they have received a washer; means on said spindle for aligning said screws with the upper end of said transport plungers after said plungers have received a washer whereby a washer received by a plunger will thereafter be urged upwardly upon the shank of a screw by the upward movement of said plunger; parts stripping means on said frame disposed in the path of said transport plungers between said last-mentioned means and said transfer disc to strip the washers and screws from said transport plungers; an inspection unit on said frame that detects the presence of washerless screws in said transport plungers, said unit including sensing means disposed in the path of said plungers to detect the elevation of the screws disposed therein; a rejection element on said frame in the path of the parts stripped from said transport plungers for separating washerless screws from washer-carrying screws; and means operatively interposed between said sensing means and said rejection element to actuate said rejection element a predetermined interval of time after said sensing means has detected the elevation of said screws.

6. The combination of claim 5 wherein said parts stripping means directs said washers and screws into a chute, said rejection element includes an electric solenoid-operated gate that controls the passage of parts through said chute, said sensing means includes an electric switch, and the last-mentioned means includes electric circuit means interconnecting said switch and said solenoid and having time-delay means that delay the operation of said gate for a predetermined interval.

7. In an assembling machine for automatically disposing a washer or the like upon the shank of a screw or the like, the combination of: a frame; a spindle rotatably mounted on said frame; a horizontally extending washer pick-up disc keyed to said spindle, the periphery of said disc being formed with a plurality of washer-receiving notches; means on said frame for positioning one of said washers within each of said notches; power-operated means on said frame for rotating said spindle; a plurality of vertically movable transport plungers on said spindle, with each of said plungers being in vertical alignment with one of said washer-receiving notches so as to receive a washer therefrom adjacent the periphery of said pick-up disc; means interposed between said transport plungers and said frame to control the elevation of said plungers said means moving said plungers upwardly after they have received a washer; means on said spindle for aligning said screws with the upper end of said transport plungers after said plungers have received a washer whereby a washer received by a plunger will thereafter be urged upwardly upon the shank of a screw by the upward movement of said plunger; and parts stripping means on said frame disposed in the path of said transport plungers to strip the assembled washers and screws from said transport plungers.

8. In an assembling machine for automatically disposing a washer or the like upon the shank of a screw or the like, the combination of: a frame; a spindle rotatably mounted on said frame; a horizontally extending washer pick-up disc keyed to said spindle, the periphery of said disc being formed with a plurality of washer-receiving notches; means on said frame for positioning one of said washers within each of said notches; power-operated means on said frame to rotate said spindle; a plurality of vertically movable transport plungers on said spindle, with each of said plungers being in vertical alignment with one of said washer-receiving elements so as to receive a washer therefrom adjacent the periphery of said pick-up disc; means on said spindle for aligning said screws with the upper end of said transport plungers after said plungers have received a washer whereby a washer received by a plunger will thereafter be urged upwardly upon the shank of a screw by the upward movement of said plunger; parts stripping means on said frame disposed in the path of said transport plungers to strip the washers and screws from said transport plungers; cam means interposed between said transport plungers and said frame to control the elevation of said plungers, said cam means permitting said transport plungers to move downwardly adjacent said parts stripping means; and an ejection rod slidably disposed within each of said transport plungers, each of said rods being secured to said spindle and held against vertical movement whereby its upper end will eject an assembled washer and screw from its respective transport plunger adjacent said parts stripping means.

9. In an assembling machine for automatically disposing a washer or the like upon the shank of a screw or the like, the combination of: a frame; a spindle mounted on said frame for rotation about a vertical axis; a horizontally extending washer pick-up disc keyed to said spindle, the periphery of said disc being formed with a plurality of washer-receiving notches; means on said frame for positioning one of said washers within each of said notches; power-operated means on said frame for rotating said spindle; a plurality of vertically movable transport plungers on said spindle, with each of said plungers being in vertical alignment with one of said washer-receiving elements so as to receive a washer therefrom adjacent the periphery of said pick-up disc; means interposed between said transport plungers and said frame to control the elevation of said plungers said means moving said plungers upwardly after they have received a washer; means on said spindle for aligning said screws with the upper end of said transport plungers after a washer has been received by said plunger whereby a washer received by a plunger will thereafter be urged upwardly upon the shank of a screw by the upward movement of said plunger; parts stripping means on said frame disposed in the path of said transport plungers to strip the washers and screws from said transport plungers; an inspection unit on said frame that detects the presence of washerless screws in said transport plungers, said unit including sensing means disposed in the path of said plungers to detect the elevation of the screws disposed therein; a rejection element on said frame in the path of the parts stripped from said transport plungers for separating washerless screws from washer-carrying screws; and means operatively interposed between said sensing means and said rejection element to actuate said rejection element.

10. The combination of claim 9 wherein said parts stripping means directs said washers and screws into a chute, said rejection element includes an electric solenoid-operated gate that controls the passage of parts through said chute, said sensing means includes an electric switch, and the last-mentioned means includes electric circuit means interconnecting said switch and said solenoid and having time-delay means that delay the operation of said gate for a predetermined interval.

11. In an assembling machine for automatically disposing a washer or the like upon the shank of a screw or the like, the combination of: a frame; a spindle rotatably mounted on said frame; a horizontally extending washer pick-up disc keyed to said spindle, the periphery of said disc being formed with a plurality of washer-receiving notches; means on said frame for positioning one of said washers within each of said notches; power-operated means on said frame for rotating said spindle; a plurality of vertically movable transport plungers on said spindle, with each of said plungers being in vertical alignment with one of said washer-receiving elements so as to receive a washer therefrom adjacent the periphery of said pick-up disc; means on said spindle for aligning said screws with the upper end of said transport plungers after said plungerss have received a washer whereby a washer received by a plunger will thereafter be urged upwardly upon the shank of a screw by the upward movement of said plunger; parts stripping means on said frame disposed in the path of said transport plungers between said last-mentioned means and said transfer disc to strip the washers and screws from said transport plungers; cam means interposed between said transport plungers and said frame to control the elevation of said plungers, said cam means permitting said transport plungers to move downwardly adjacent said parts stripping means; an ejection rod slidably disposed within each of said transport plungers, each of said rods being secured to said spindle and held against vertical movement whereby its upper end will eject an assembled washer and screw from its respective transport plunger adjacent said parts stripping means; an inspection unit on said frame that detects the presence of washerless screws in said transport plungers, said unit including sensing means disposed in the path of said plungers to detect the elevation of the screws disposed therein; a rejection element on said frame in the path of the parts stripped from said transport plungers for separating washerless screws from washer-carrying screws; and means operatively interposed between said sensing means and said rejection element to actuate said rejection element a predetermined interval of time after said sensing means has detected the elevation of said screws.

12. The combination of claim 11 wherein said parts stripping means directs said washers and screws into a chute, said rejection element includes an electric solenoid-operated gate that controls the passage of parts through said chute, said sensing means includes an electric switch, and the last-mentioned means includes electric circuit means interconnecting said switch and said solenoid and having time-delay means that delay the operation of said gate for a predetermined interval.

13. In an assembling machine for automatically disposing a washer or the like upon the shank of a screw or the like, the combination of: a frame; a spindle rotatably mounted on said frame; a horizontally extending washer pick-up disc keyed to said spindle, the periphery of said disc being formed with a plurality of washer-receiving notches; a means on said frame for positioning one of said washers within each of said notches; power-operated means on said frame for rotating said spindle; a plurality of vertically movable transport plungers with each of said plungers being in vertical alignment with one of said washer-receiving elements so as to receive a washer therefrom adjacent the periphery of said pick-up disc; a plunger carriage for each of said transport plungers, said carriages being vertically slidably supported by said spindle and provided with a cam roller; a cam track on said frame below said spindle with said cam rollers following said track to control the elevation of said transport plungers said plungers being urged upwardly after receiving a washer; means on said spindle for aligning said screws with the upper end of said transport plungers after said plungers have received a washer whereby a washer received by a plunger will thereafter be urged upwardly upon the shank of a screw by the upward movement of said plunger; and parts stripping means on said frame disposed in the path of said transport plungers between said last-mentioned means and said transfer disc to strip the washers and screws from said transport plungers.

14. In an assembling machine for automatically disposing a washer or the like upon the shank of a screw or the like, the combination of: a frame; a spindle mounted on said frame for rotation about a vertical axis; a horizontally extending washer pick-up disc keyed to said spindle, the periphery of said disc being formed with a plurality of washer-receiving notches; means on said frame for positioning one of said washers within each of said notches; power-operated means on said frame for rotating said spindle; a plurality of vertically movable transport plungers, with each of said plungers being in vertical alignment with one of said washer-receiving elements so as to receive a washer therefrom adjacent the periphery of said pick-up disc; means on said spindle for aligning said screws with the upper end of said transport plungers after said plungers have received a washer whereby a washer received by a plunger will thereafter be urged upwardly upon the shank of a screw by the upward movement of said plunger; parts stripping means on said frame disposed in the path of said transport plungers between said last-mentioned means and said transfer disc to strip the washers and screws from said transport plungers; a plunger carriage for each of said transport plungers, said carriages being vertically slidably supported by said spindle and provided with a cam roller; a cam track on said frame below said spindle with said cam rollers following said track to control the elevation of said transport plungers, said transport plungers moving downwardly adjacent said parts stripping means; and an ejection rod slidably disposed within each of said transport plungers, each of said rods being secured to said spindle and held against vertical movement whereby its upper end will eject an assembled washer and screw from its respective transport plunger adjacent said parts stripping means.

15. In an assembling machine for automatically disposing a washer or the like upon the shank of a screw or the like, the combination of: a frame; a spindle rotatably mounted on said frame; a horizontally extending washer pick-up disc keyed to said spindle, the periphery of said disc being formed with a plurality of washer-receiving notches; means on said frame for positioning one of said washers within each of said notches; power-operated means on said frame for rotating said spindle; a plurality of vertically movable transport plungers with each of said plungers being in vertical alignment with one of said washer-receiving elements so as to receive a washer therefrom adjacent the periphery of said transport disc; a plunger carriage for each of said transport plungers, said carriages being vertically slidably supported by said spindle and provided with a cam roller; a cam track on said frame below said spindle with said cam rollers following said track to control the elevation of said transport plungers, said plungers being urged upwardly after receiving a washer; means on said spindle for aligning said screws with the upper end of said transport plungers after said plungers have received a washer whereby a washer received by a plunger will thereafter be urged upwardly upon the shank of a screw by the upward movement of said plunger; and parts stripping means on said frame disposed in the path of said transport plungers between said last-mentioned means and said pick-up disc to strip the washers and screws from said transport plungers; an inspection unit on said frame that detects the presence of washerless screws in said transport plungers, said unit including sensing means disposed in the path of said plungers to detect the elevation of the screws disposed therein; a rejection element on said frame in the path of the parts stripped from said transport plungers for separating washerless screws from washer-carrying screws; and means operatively interposed between said sensing means and said rejection element to actuate said rejection element.

16. In an assembling machine for automatically disposing a washer or the like upon the shank of a screw or the like, the combination of: a frame; a spindle mounted on said frame for rotation about a vertical axis; a horizontally extending washer pick-up disc keyed to said spindle, the periphery of said disc being formed with a plurality of washer-receiving notches; means on said frame for positioning one of said washers within each of said notches; power-operated means on said frame for rotating said spindle; a plurality of vertically movable transport plungers, with each of said plungers being in vertical alignment with one of said washer-receiving elements so as to receive a washer therefrom adjacent the periphery of said transport disc; means on said spindle for aligning said screws with the upper end of said transport plungers after said plungers have received a washer whereby a washer received by a plunger will thereafter be urged upwardly upon the shank of a screw by the upward movement of said plunger; parts stripping means on said frame disposed in the path of said transport plungers between said last mentioned means and said pick-up disc to strip the washers and screws from said transport plungers; a plunger carriage for each of said transport plungers, said carriages being vertically slidably supported by said spindle and provided with a cam roller; a cam track on said frame below said spindle with said cam rollers following said track to control the elevation of said transport plungers, said transport plungers moving downwardly adjacent said part stripping means; an ejector rod slidably disposed within each of said transport plungers, each of said rods being secured to said spindle and held against vertical movement whereby its upper end will eject an assembled washer and screw from its respective transport plunger adjacent said parts stripping means; an inspection unit on said frame that detects the presence of washerless screws in said transport plungers, said unit including sensing means disposed in the path of said plungers to detect the elevation of the screws disposed therein; a rejection element on said frame in the path of the parts stripped from said transport plungers for separating washerless screws from washer-carrying screws; and means operatively interposed between said sensing means and said rejector element to actuate said rejection element.

17. In an assembling machine for automatically disposing a washer or the like upon the shank of a screw or the like, the combination of: a frame; a horizontally extending washer transfer disc rotatably mounted upon said frame; a spindle rotatably mounted on said frame; a horizontally extending washer pick-up disc keyed to said spindle, with a portion of said washer pick-up disc overlying said transfer disc and the periphery of said pick-up disc being formed with a plurality of washer-receiving notches; means on said frame defining a passageway overlying the upper surface of said transfer disc whereby said washers are directed into said washer-receiving notches; power-operated means on said frame for rotating said transfer disc and spindle; a plurality of vertically movable transport plungers with each of said plungers being in vertical alignment with one of said washer-receiving elements so as to receive a washer therefrom adjacent the periphery of said pick-up disc; a plunger carriage for each of said transport plungers, said carriages being vertically slidably supported by said spindle and provided with a cam roller; a cam track on said frame below said spindle with said cam rollers following said track to control the elevation of said transport plungers, said plungers being urged upwardly after receiving a washer; means on said spindle for aligning said screws with the upper end of said transport plungers after said plungers have received a washer whereby a washer received by a plunger will thereafter be urged upwardly upon the shank of a screw by upward movement of said plungers; and parts stripping means on said frame disposed in the path of said transport plungers between said last-mentioned means and said transfer disc to strip the washers and screws from said transport plungers.

18. In an assembling machine for automatically disposing a washer or the like upon the shank of a screw or the like, the combination of: a frame; a horizontally extending washer transfer disc rotatably mounted upon said frame; a spindle rotatably mounted on said frame; a horizontally extending washer pick-up disc keyed to said spindle, with a portion of said washer pick-up disc overlying said transfer disc and the periphery of said pick-up disc being formed with a plurality of washer-receiving notches; means on said frame defining a passageway overlying the upper surface of said transfer disc whereby said washers are directed into said washer-receiving notches; power-operated means on said frame for rotating said transfer disc and spindle; a plurality of vertically movable transport plungers, with each of said plungers being in vertical alignment with one of said washer-receiving elements so as to receive a washer therefrom adjacent the periphery of said pick-up disc; means on said spindle for aligning said screws with the upper end of said transport plungers after said plungers have received a washer whereby a washer received by a plunger will thereafter be urged upwardly upon the shank of a screw by the upward movement of said plunger; parts stripping means on said frame disposed in the path of said transport plungers between said last-mentioned means and said transfer disc to strip the washers and screws from said transport plungers; a plunger carriage for each of said transport plungers, said carriages being vertically slidably supported by said spindle and provided with a cam roller; a cam track on said frame below said spindle with said cam rollers following said track to control the elevation of said transport plungers, said transport plungers moving downwardly adjacent said parts stripping means; and an ejection rod slidably disposed within each of said transport plungers, each of said rods being secured to said spindle and held against vertical movement whereby its upper end will eject an assembled washer and screw from its respective transport plunger adjacent said parts stripping means.

19. In an assembling machine for automatically disposing a washer or the like upon the shank of a screw or the like, the combination of: a frame; a spindle rotatably mounted on said frame; a horizontally extending washer pick-up disc keyed to said spindle, the periphery of said disc being formed with a plurality of washer-receiving notches; means on said frame for positioning one of said washers within each of said notches; a spindle rotatably mounted on said frame on the axis of rotation of said pick-up disc and below said pick-up disc; power-operated means on said frame for rotating said spindle; a plurality of vertically movable transport plungers on said spindle, with each of said plungers being in vertical alignment with one of said washer-receiving elements so as to receive a washer therefrom adjacent the periphery of said pick-up disc; cam means interposed between said transport plungers and said frame to control the elevation of said plungers, said cam means urging said transport plungers upwardly after the latter receive one of said washers; a horizontally extending squaring-up disc rotatably mounted on said frame adjacent said pick-up disc and in the path of said transport plungers, with said plungers urging the upper surface of said washers into engagement with the underside of said squaring-up disc whereby said washers will assume a horizontal position; means on said spindle for aligning said screws with the upper end of said transport plungers after said plungers have received a washer whereby a washer received by a plunger will thereafter be urged upwardly upon the shank of a screw by upward movement of said plunger; and parts stripping means on said frame disposed in the path of said transport plungers to strip the washers and screws from said transport plungers.

20. In an assembling machine for automatically disposing a washer or the like upon the shank of a screw or the like, the combination of: a frame; a spindle mounted on said frame for rotation about a vertical axis; a horizontally extending washer pick-up disc keyed to said spindle, the periphery of said disc being formed with a plurality of washer-receiving notches; means on said frame for positioning one of said washers within each of said notches; power-operated means on said frame for rotating said spindle; a plurality of vertically movable transport plungers on said spindle, with each of said plungers being in vertical alignment with one of said washer-receiving elements so as to receive a washer therefrom adjacent the periphery of said pick-up disc; means interposed between said transport plungers and said frame to control the elevation of said plungers; a screw feed chute on said frame having a horizontal release plate formed with a screw-release notch that faces towards the direction of rotation of said washer pick-up disc; a screw pick-up head keyed to said spindle; a plurality of screw pick-up fingers carried by said screw pick-up head, each having a screw-receiving notch that picks up a screw disposed in said screw-release notch as its respective finger rotates past said screw-release plate; a screw head lock-up member for each of said fingers carried by said screw pick-up head in vertical alignment with said fingers, each of such members including a vertically movable lock-up plunger adapted to abut the head of a screw disposed within the screw-receiving notch of its respective finger to temporarily support said screw upon said finger, such screw thereafter being encompassed by the upper end of one of said transport plungers after said plunger has received a washer at said upper end; means normally biasing said lock-up plungers downwardly; and means operatively interposed between said lock-up plungers and said frame for automatically raising said lock-up plungers to clear said screw-release plate and the head of a screw disposed in said screw-release notch as said screw head lock-up member rotates past said release plate.

21. In an assembling machine for automatically disposing a washer or the like upon the shank of a screw or the like, the combination of: a frame; a spindle mounted on said frame for rotation about a vertical axis; a horizontally extending washer pick-up disc keyed to said spindle, the periphery of said disc being formed with a plurality of washer-receiving notches; means on said frame for positioning one of said washers within each of said notches; power-operated means on said frame for rotating said spindle; a plurality of vertically movable transport plungers on said spindle, with each of said plungers being in vertical alignment with one of said washer-receiving elements so as to receive a washer therefrom adjacent the periphery of said pick-up disc; means interposed between said transport plungers and said frame to control the elevation of said plungers, said means moving said plungers upwardly after they have received a washer; a screw feed chute on said frame having a horizontal release plate formed with a screw-release notch that faces towards the direction of rotation of said washer pick-up disc; a screw pick-up head keyed to said spindle; a plurality of screw pick-up fingers carried by said screw pick-up head, each having a screw-receiving notch that picks up a screw disposed in said screw-release notch as its respective finger rotates past said screw-release plate; a screw head lock-up member for each of said fingers carried by said screw pick-up head in vertical alignment with said fingers, each of such members including a vertically movable lock-up plunger adapted to abut the head of a screw disposed within the screw-receiving notch of its respective finger to temporarily support said screw upon said finger, such screw thereafter being encompassed by the upper end of one of said transport plungers after the upper end of said plunger has received a washer; means normally biasing said lock-up plungers downwardly; means operatively interposed between said lock-up plungers and said frame for automatically raising said lock-up plungers to clear said screw-release plate and the head of a screw disposed in said screw-release notch as said screw head lock-up member rotates past said release plate; parts stripping means on said frame disposed in the path of said transport plungers to strip the washers and screws from said transport plungers; an inspection unit on said frame that detects the presence of washerless screws in said transport plungers, said unit including sensing means disposed in the path of said lock-up plungers to detect the elevation thereof; a rejection element on said frame in the path of the parts stripped from said transport plungers for separating washerless screws from washer-carrying screws; and means operatively interposed between said sensing means and said rejection element to actuate said rejection element.

22. The combination of claim 21 wherein said parts stripping means directs said washers and screws into a chute, said rejection element includes an electric solenoid-operated gate that controls the passage of parts through said chute, said sensing means includes an electric switch, and the last-mentioned means includes electric circuit means interconnecting said switch and said solenoid and having time-delay means that delay the operation of said gate for a predetermined interval.

23. In an assembling machine for automatically disposing a washer or the like upon the shank of a screw or the like, the combination of: a frame; a spindle rotatably mounted on said frame for rotation about a vertical axis; a plurality of transport plungers on said spindle; first means on said frame adapted to insert a washer upon the upper end of each of said transport plungers; second means on said frame operable to effect the insertion of a screw into the upper end of each of said transport plungers whereby a washer received by one of the transport plungers will be urged upon the shank of a screw received by said transport plunger; a screw pick-up head keyed to said spindle; a plurality of screw pick-up fingers carried by said screw pick-up head, each of said fingers being pivotally attached to said pick-up head and normally being biased to assume a generally radially extending position relative thereto with the outer end of said finger being formed with a screw-receiving notch and the opposite end of said finger supporting a cam roller; a finger retract cam rigidly supported by said frame above said screw pick-up head with said finger retract cam being engaged by the cam rollers of said screw pick-up fingers; an inspection unit of said frame in the path of said transport plungers for detecting the elevation of the screws within said transport plungers and hence the presence or absence of a washer on said screws, with the cam rollers of said fingers cooperating with said finger retract cam to effect temporary retraction of the radially outer end of said fingers whereby they will clear said inspection unit as they rotate thereby; and means operatively connected to said inspection unit for separating washerless screws from washer-carrying screws.

24. In an assembling machine for automatically disposing a washer or the like upon the shank of a screw or the like, the combination of: a frame; a spindle rotatably mounted on said frame for rotation about a vertical axis; a plurality of transport plungers on said spindle, each adapted to receive one of said washers at its upper end; a screw feed chute on said frame having a horizontal release plate formed with a screw-release notch that faces towards the direction of rotation of said spindle; a screw pick-up head keyed to said spindle; a plurality of screw pick-up fingers carried by said screw pick-up head, each of said fingers being pivotally attached to said pick-up head and normally being biased to assume a generally radially extending position relative thereto with the outer end of said finger being formed with a screw-receiving notch and the opposite end of said finger supporting a cam roller; a screw-receiving notch that picks up a screw disposed in said screw-release notch as its respective finger rotates past said screw-release plate, such screw thereafter being received by the upper end of one of said transport plungers and the washer supported by said plunger, and the opposite end of said finger being formed with a cam roller; a finger retract cam rigidly supported by said frame above said screw pick-up head with said finger retract cam being engaged by the cam rollers of said screw pick-up fingers; an inspection unit on said frame in the path of said transport plungers for detecting the elevation of the screws within said transport plungers and hence the presence or absence of a washer on said screws with the cam rollers of said fingers cooperating with said finger retract cam to effect retraction of the radially outer end of said fingers whereby they will clear said inspection unit; and means operatively connected to said inspection unit for separating washerless screws from washer-carrying screws.

25. In an assembling machine for automatically disposing a washer or the like upon the shank of a screw or the like, the combination of: a frame; a spindle mounted on said frame for rotation about a vertical axis; a horizontally extending washer pick-up disc keyed to said spindle, the periphery of the said disc being formed with a plurality of washer-receiving notches; means on said frame for positioning one of said washers within each of said notches; power-operated means on said frame for rotating said spindle; a screw feed chute on said frame having a horizontal release plate formed with a screw-release notch that faces towards the direction of rotation of said washer pick-up disc; a screw pick-up head keyed to said spindle; a plurality of screw pick-up fingers carried by said screw pick-up head, each of said fingers being pivotally attached to said pick-up head and normally being biased to assume a generally radially extending position relative thereto with the outer end of said finger being formed with a screw-receiving notch that picks up a screw disposed in said screw-release notch as its respective finger rotates past said screw-release plate, and the opposite end of said finger supporting a cam roller; a plurality of transport plungers carried by said spindle in vertical alignment with said washer-receiving notches, said plungers being vertically movable whereby the upper ends of each may first receive one of said washers and thereafter one of said screws from one of said fingers; a finger retract cam rigidly supported by said frame above said screw pick-up head with said finger retract cam being engaged by the cam rollers of said screw pick-up fingers; an inspection unit on said frame in the path of said transport plungers for detecting the elevation of the screws within said transport plungers and hence the presence or absence of a washer on said screws, with the cam rollers of said fingers cooperating with said finger retract cam to effect retraction of the radially outer end of said fingers whereby they will clear said inspection unit; and means operatively connected to said inspection unit for separating washerless screws from washer-carrying screws.

26. In an assembling machine for automatically disposing a washer or the like upon the shank of a screw or the like, the combination of: a frame; a spindle rotatably mounted on said frame for rotation about a vertical axis; a plurality of transport plungers on said spindle; means on said frame adapted to insert a washer upon the upper end of each of said transport plungers; a screw pick-up head keyed to said spindle; a plurality of screw pick-up fingers carried by said screw pick-up head, each of said fingers being pivotally attached to said pick-up head and normally being biased to assume a generally radially extending position relative thereto with the outer end of said finger being formed with a screw-receiving notch and the opposite end of said finger supporting a cam roller; a screw head lock-up member for each of said screw pick-up fingers carried by said screw pick-up head in vertical alignment with said fingers, each of such members including a vertically movable lock-up plunger adapted to abut the head of a screw disposed within the screw-receiving notch of its respective finger to temporarily support said screw upon said finger, before said screw is received by the upper end of one of said transport plungers; spring means normally biasing said lock-up plungers downwardly; means operatively interposed between said lock-up plungers and said frame for automatically raising said lock-up plungers to clear said screw-release plate and the head of a screw disposed in said screw-release notch as its respective screw head lock-up member rotates past said release plate; a finger retract cam rigidly supported by said frame above said screw pick-up head, with said finger retract cam being engaged by the cam rollers of said screw pick-up fingers; an inspection unit on said frame in the path o fsaid transport plungers for detecting the elevation of the screws within said transport plungers and hence the presence or absence of a washer on said screws, with the cam rollers of said fingers cooperating with said finger retract cam to effect temporary retraction of the radially outer end of said fingers whereby they will clear said inspection unit as they rotate thereby; and means operatively connected to said inspection unit for separating washerless screws from washer-carrying screws.

27. In an assembling machine for automatically disposing a washer or the like upon the shank of a screw or the like, the combination of: a frame; a spindle rotatably mounted on said frame for rotation about a vertical axis; a plurality of transport plunger on said spindle; first means on said frame adapted to position a washer upon the upper end of each of said transport plungers; second means on said frame operable to effect the insertion of a screw through the upper end of each of said transport plungers whereby a washer received by one of the transport plungers will thereafter be urged upwardly upon the shank of a screw; parts stripping means on said frame disposed in the path of said transport plungers to strip the assembled washers and screws from said transport plungers; an inspection unit on said frame that detects the presence of washerless screws in said transport plungers after said washers should have been received by said screws, said unit including sensing means disposed in the path of said plungers to detect the elevation of the screws disposed therein and hence the presence or absence of a washer on said screws; a rejection element on said frame in the path of the parts stripped from said transport plungers for separating washerless screws from washer-carrying screws; and means operatively interposed between said sensing means and said rejection element to actuate said rejection element when a washerless screw is detected by said sensing means.

28. The combination of claim 27 wherein said parts stripping means directs said washers and screws into a chute, said rejection element includes an electric solenoid-operated gate that controls the passage of parts through said chute, said sensing means includes an electric switch, and the last-mentioned means includes electric circuit means interconnecting said switch and said solenoid, said electric circuit including a holding circuit that automatically delays energization of said solenoid for a predetermined time interval after said sensing means has detected a washerless screw in one of said transport plungers.

29. In an assembling machine for automatically disposing a washer or the like upon the shank of a screw or the like, the combination of: a frame; a spindle rotatably mounted on said frame; a horizontally extending washer pick-up disc keyed to said spindle, the periphery of said disc being formed with a plurality of washer-receiving notches; means on said frame for positioning one of said washers within each of said notches; power-operated means on said frame for rotating said spindle; a plurality of vertically movable transport plungers with each of said plungers being in vertical alignment with one of said washer-receiving elements so as to receive a washer therefrom adjacent the periphery of said pick-up disc; a plunger carriage for each of said transport plungers, said carriages being vertically slidably supported by said spindle and provided with a cam roller; a cam track on said frame below said spindle with said cam rollers following said track to control the elevation of said transport plungers, said plungers being urged upwardly after receiving a washer; means on said spindle for aligning said screws with the upper end of said transport plungers after said plungers have received a washer whereby a washer received by a plunger will thereafter be urged upwardly upon the shank of a screw by the upward movement of said plunger; and parts stripping means on said frame disposed in the path of said transport plungers between said last-mentioned means and said transfer disc to strip the washers and screws from said transport plungers; an inspection unit on said frame that detects the presence of washerless screws in said transport plungers, said unit including sensing means disposed in the path of said plungers to detect the elevation of the screws disposed therein; a rejection element on said frame in the path of the parts stripped from said transport plungers for separating washerless screws from washer-carrying screws; and means operatively interposed between said sensing means and said rejection element to actuate said rejection element a predetermined interval of time after said sensing means has detected the elevation of said screws.

30. The combination of claim 29 wherein said parts stripping means directs said washers and screws into a chute, said rejection element includes an electric solenoid-operated gate that controls the passage of parts through said chute, said sensing means includes an electric switch, and the last-mentioned means includes electric circuit means interconnecting said switch and said solenoid, said electric circuit including a holding circuit that automatically delays energization of said solenoid for a predetermined time interval after said sensing means has detected a washerless screw in one of said transport plungers.

31. In an assembling machine for automatically disposing a washer or the like upon the shank of a screw or the like, the combination of: a frame, a spindle mounted on said frame for rotation about a vertical axis; a horizontally extending washer pick-up disc keyed to said spindle, the periphery of said disc being formed with a plurality of washer-receiving notches; means on said frame for positioning one of said washers within each of said notches; power-operated means on said frame for rotating said spindle; a plurality of vertically movable transport plungers, with each of said plungers being in vertical alignment with one of said washer-receiving elements so as to receive a washer therefrom adjacent the periphery of said pick-up disc; means on said spindle for aligning said screws with the upper end of said transport plungers after a washer has been received by said plungers whereby a washer received by a plunger will thereafter be urged upwardly upon the shank of a screw by upward movement of said plunger; parts stripping means on said frame disposed in the path of said transport plungers between said last-mentioned means and said pick-up disc to strip the washers and screws from said transport plungers; a plunger carriage for each of said transport plungers, said carriages being vertically slidably supported by said spindle and provided with a cam roller; a cam track on said frame below said spindle with said cam rollers following said track to control the elevation of said transport plungers, said transport plungers moving downwardly adjacent said parts stripping means; an ejection rod slidably disposed within each of said transport plungers, each of said rods being secured to said spindle and held against vertical movement whereby its upper end will eject an assembled washer and screw from its respective transport plunger adjacent said parts stripping means; an inspection unit on said frame that detects the presence of washerless screws in said transport plungers, said unit including sensing means disposed in the path of said plungers to detect the elevation of the screws disposed therein; a rejection element on said frame in the path of the parts stripped from said transport plungers for separating washerless screws from washer-carrying screws; and means operatively interposed between said sensing means and said rejection element to actuate said rejection element a predetermined interval of time after said sensing means has detected the elevation of said screws.

32. The combination of claim 31 wherein said parts stripping means directs said washers and screws into a chute, said rejection element includes an electric solenoid-operated gate that controls the passage of parts through said chute, said sensing means includes an electric switch, and the last-mentioned means includes electric circuit means interconnecting said switch and said solenoid, said electric circuit including a holding circuit that automatically delays energization of said solenoid for a predetermined time interval after said sensing means has detected a washerless screw in one of said transport plungers.

33. In an assembling machine for automatically disposing a washer or the like upon the shank of a screw or the like, the combination of: a frame, a spindle mounted on said frame for rotation about a vertical axis; a horizontally extending washer pick-up disc keyed to said spindle, the periphery of said disc being formed with a plurality of washer-receiving notches; means on said frame for positioning one of said washers within each of said notches; power-operated means on said frame for rotating said spindle; a plurality of vertically movable transport plungers on said spindle, with each of said plungers being in vertical alignment with one of said washer-receiving elements so as to receive a washer therefrom adjacent the periphery of said pick-up disc; means interposed between said transport plungers and said frame to control the elevation of said plungers, said means moving said plungers upwardly after they have received a washer and said plungers being free to move downwardly under the influence of gravity; a screw feed chute on said frame having a horizontal release plate formed with a screw-release notch that faces towards the direction of rotation of said washer pick-up disc; a screw pick-up head keyed to said spindle; a plurality of screw pick-up fingers carried by said screw pick-up head, each having a screw-receiving notch that picks up a screw disposed in said screw-release notch as its respective finger rotates past said screw-release plate; a screw head lock-up member for each of said fingers carried by said screw pick-up head in vertical alignment with said fingers, each of such members including a vertically movable lock-up plunger adapted to abut the head of a screw disposed within the screw-receiving notch of its respective finger to temporarily support said screw upon said finger, such screw thereafter being encompassed by the upper end of one of said transport plungers that has received one of said washers; means normally biasing said lock-up plungers downwardly; means operatively interposed between said lock-up plungers and said frame for automatically raising said lock-up plungers to clear said screw-release plate and the head of a screw disposed in said screw-release notch as said screw head lock-up member rotates past said release plate; parts stripping means on said frame disposed in the path of said transport plungers to strip the washers and screws from said transport plunger; an inspection unit on said frame that detects the presence of washerless screws in said transport plungers, said unit including sensing means disposed in the path of said lockup plungers to detect the elevation thereof; a rejection element on said frame in the path of the parts stripped from said transport plungers for separating washerless screws from washer-carrying screws; and means operatively interposed between said sensing means and said rejection element to actuate said rejection element a predetermined interval of time after said sensing means has detected the elevation of said screws.

34. The combination of claim 33 wherein said parts stripping means directs said washers and screws into a chute, said rejection element includes an electric solenoid-operated gate that controls the passage of parts through said chute, said sensing means includes an electric switch, and the last-mentioned means includes electric circuit means interconnecting said switch and said solenoid, said electric circuit including a holding circuit that automatically delays energization of said solenoid for a predetermined time interval after said sensing means has detected a washerless screw in one of said transport plungers.

References Cited in the file of this patent

UNITED STATES PATENTS

| | | |
|---|---|---|
| 336,994 | Ellis | Mar. 2, 1886 |
| 1,274,562 | Hull | Aug. 6, 1918 |
| 1,726,307 | Ober | Aug. 27, 1929 |
| 2,910,768 | Heidergott | Nov. 3, 1959 |
| 2,931,095 | Esken | Apr. 5, 1960 |
| 2,996,738 | Wilson | Aug. 22, 1961 |